US005088056A

United States Patent [19]

McIntosh et al.

[11] Patent Number: 5,088,056

[45] Date of Patent: * Feb. 11, 1992

[54] MEDICATION CLOCK

[75] Inventors: Kenneth B. McIntosh, Rte. 4, Box 119, Greensburg, Ind. 47240; James O. Pratt, Murfreesboro, Tenn.; Donald E. Stout, Annandale, Va.

[73] Assignee: Kenneth B. McIntosh, Greensburg, Ind.

[ * ] Notice: The portion of the term of this patent subsequent to Jul. 21, 2004 has been disclaimed.

[21] Appl. No.: 587,044

[22] Filed: Sep. 24, 1990

Related U.S. Application Data

[63] Continuation of Ser. No. 338,594, Apr. 14, 1989, Pat. No. 4,970,669, which is a continuation of Ser. No. 70,221, Jul. 6, 1987, Pat. No. 4,837,719, which is a continuation-in-part of Ser. No. 702,746, Feb. 19, 1985, Pat. No. 4,682,299.

[51] Int. Cl.[5] .......................... G08B 1/00; G06F 15/42

[52] U.S. Cl. .............................. 364/569; 340/309.15; 364/413.02; 368/10

[58] Field of Search .................. 364/569, 479, 413.02, 364/413.03, 413.04; 368/10, 251; 340/309.4, 309.3, 309.15, 309.05

[56] References Cited

U.S. PATENT DOCUMENTS

| | | | |
|---|---|---|---|
| 4,121,574 | 10/1978 | Lester | 128/2.05 R |
| 4,223,801 | 9/1980 | Carlson | 368/10 |
| 4,293,845 | 10/1981 | Villa-Real | 340/309.3 |
| 4,419,016 | 12/1983 | Zoltan | 368/10 |
| 4,473,884 | 4/1984 | Behl | 364/479 |
| 4,588,303 | 5/1986 | Wirtschafter et al. | 368/10 |
| 4,626,105 | 12/1986 | Miller | 368/10 |
| 4,660,991 | 4/1987 | Simon | 368/10 |
| 4,682,299 | 7/1987 | McIntosh et al. | 364/569 |
| 4,695,954 | 9/1987 | Rose et al. | 364/413 |
| 4,725,997 | 2/1988 | Urquhart et al. | 368/10 |
| 4,725,999 | 2/1988 | Tate | 368/10 |
| 4,731,765 | 3/1988 | Cole et al. | 368/10 |
| 4,768,176 | 8/1988 | Kehr et al. | 368/10 |
| 4,768,177 | 8/1988 | Kehr et al. | 368/10 |
| 4,831,562 | 5/1989 | McIntosh et al. | 364/569 |
| 4,837,719 | 6/1989 | McIntosh et al. | 364/569 |
| 4,942,544 | 7/1990 | McIntosh et al. | 364/569 |
| 4,970,662 | 11/1990 | McIntosh et al. | 364/569 |

FOREIGN PATENT DOCUMENTS

| | | |
|---|---|---|
| 3738184 | 5/1988 | Fed. Rep. of Germany . |
| 156350 | 9/1984 | Japan . |
| 56655 | 3/1986 | Japan . |

*Primary Examiner*—Kevin J. Teska

*Attorney, Agent, or Firm*—Antonelli, Terry, Stout & Kraus

[57] ABSTRACT

A programmed clock is disclosed for signalling a person the time that dosages of medication are to be taken in compliance with a medication regimen. A record producing apparatus is provided for producing a record of the person's compliance with the medication regimen. A control program, including a programmed timer, determines the time that dosages of medication are to be taken from a plurality of compartments. The program activates the record producing apparatus to provide a message that dosages of medication have been missed and that further actions should be taken in response to the missing of successive dosages of medication. The control program also activates the record producing apparatus to provide the person with information useful for correlating the actual chemical or brand name identification of the medication with the compartment storing the medication and other information regarding the medication regimen to be taken prior to activation of the timing function.

10 Claims, 11 Drawing Sheets

FIG. 6.

58

102

| | |
|---|---|
| 1 | MEDICINE IDENTIFICATION, TIME AND DATE OF TAKING EACH DOSAGE |
| 2 | |
| 3 | |
| 4 | |
| n | |
| a | TIME, DATE AND TEMPERATURE READING FOR EACH TEMPERATURE READING |
| b | TIME, DATE AND BLOOD PRESSURE READING FOR EACH BLOOD PRESSURE READING |
| c | TIME, DATE AND PULSE RATE READING FOR EACH PULSE RATE READING |
| OTHER INFORMATION FOR PERFORMANCE OF ALARM ETC. | |

104

MEDICATION CLOCK

CROSS-REFERENCE TO RELATED APPLICATION

This is a continuation of U.S. Ser. No. 338,594, filed Apr. 14, 1989, now U.S. Pat. No. 4,970,669; which is a continuation of U.S. Ser. No. 070,221, filed July 6, 1987, now U.S. Pat. No. 4,837,719; which is a continuation-in-part of U.S. Ser. No. 702,746, filed Feb. 19, 1985, now U.S. Pat. No. 4,682,299. Application Ser. No. 702,746 is incorporated herein by reference in its entirety.

BACKGROUND OF THE INVENTION

1. Field of the Invention

The present invention relates to devices which inform persons of the time that dosages of medication are to be taken under a programmed time schedule to assure compliance with a medication regimen. More particularly, the invention relates to devices of the aforesaid type which produce a record of the person's compliance with a medication regimen.

2. Description of the Prior Art

The self-administration of prescribed medications has been and is a problem throughout the world. It is well known that the response to prescription medications would be much greater if persons in fact follow the directions, including dosage schedule, for taking prescription medicines specified by physicians.

Surveys indicate that 3% to 5% of hospital admissions are the result of adverse drug reactions. At least one publication has stated that the misprescription of medications by the aged may be responsible for 30,000 deaths and 1.5 million hospital admissions per year. The cost of hospital admissions caused by the improper taking of medications is conservatively estimated to be at least $1 billion per year and, in fact, may be much higher when lost employment and other indirect costs are considered.

Adverse drug reactions are directly related to the number and frequency of doses of medication which are taken. The inability to take drugs in accordance with prescribed routines may in fact substantially increase adverse drug reactions.

It is a well-known fact that the elderly are especially prone to not carefully following the instructions for the taking of medication. The consequences of not properly following the instructions for taking a medication can be especially harmful to the elderly because of the likelihood that they are taking multiple prescription medications which can interact adversely if not properly taken and further that the level of general physical infirmity in the elderly reduces their ability to withstand the effects of improperly taking medication.

A common way of generating a record of a medication regimen is to manually record the identity of the medication and time and date of taking each dosage. While this system can produce a satisfactory record to facilitate a physician's evaluation of compliance with a medication regimen, it suffers from the disadvantage that it is only as good as the thoroughness and accuracy of the record maker. Moreover, it is difficult to incorporate these manually generated records into a data base and/or a person's medical file because of the difficulty in reading handwriting.

Systems are known for dispensing medication under the control of a timer. Exemplary of these systems are those described in U.S. Pat. Nos. 4,382,688, 4,360,125, 4,293,845, 4,275,384, 4,258,354 and 4,223,801.

U.S. Pat. No. 4,382,688 describes a medicinal dispenser having an electronic timer which is used to remind the patient when it is time to take a medication stored in a container associated with the timer.

U.S. Pat. No. 4,360,125 discloses a medication inventory device which has a programmed timer. The memory stores the time that an alarm to take the medication is generated and the time that the person has access to medication by opening a compartment. A printer may be used to create a record of the data stored in the memory.

U.S. Pat. No. 4,293,845 discloses a timer for controlling the taking of dosages of medication for multiple persons. The system totalizes the number of dosages which have been taken by each person.

U.S. Pat. No. 4,275,384 discloses a portable medicine cabinet with a timer for informing the person when it is time to take any one of a plurality of medications which are stored within the cabinet. This system includes individual indicators in proximity to compartments provided within the cabinet for storing medications to indicate that it is time to take that particular medication.

U.S. Pat. No. 4,258,354 discloses a portable alarm device for indicating that it is time for a person to take medications stored within a plurality of compartments provided within the portable alarm device. The times for taking the individual medications may be programmed by a strip which is perforated at the hours that each of a plurality of medications are desired to be taken by the patient.

U.S. Pat. No. 4,223,801 discloses an automatic periodic pharmaceutical preparation dispenser for alerting persons when particular medications are to be taken.

The assignee of the present invention sold a medication clock more than a year ago which had some of the capabilities of the medication clock illustrated in FIG. 4. Specifically, this medication clock had a microprocessor including programmed clock with alarm, patient acknowledgment switches and associated storage latches, entry switches, multifunction mode switch, random access memory and read only memory. The program resident in that system operated exclusively to control the clock function and did not have any output function or capability of generating records of any type. The random access memory recorded the time that each dosage of medication wa taken. This medication clock did not have the capability of permitting the taking of medications on an as needed basis or on demand ahead of scheduled time under control of the programmed clock with alarm.

SUMMARY OF THE INVENTION

The present invention provides an improved medication clock which has advantages over the prior art. The present invention provides a permanent record of compliance with a medication regimen which is useful to determine the response to medication and to provide a complete patient history. A memory provided in conjunction with the programmable timer records the time and date for the taking of each of the medications being dispensed under the control of the timer. The storage in memory of when the person takes each dosage of the medication provides an attending physician or other personnel with the ability to analyze the person's schedule of taking various prescribed medications and the number of dosages taken which can be invaluable for diagnostic or other purposes in analyzing a person's response to medications. By the use of a printer or other suitable output device for outputting the contents of the memory, a permanent record is obtained of the person's time of taking each dosage of medication to provide information in a form which is readily storable in a person's medical records by the attending physician. An important part of the permanent record is the correlation of the actual identification of the medication being taken with the compartment storing the medication. The printer is used to print out text which permits the correlation of the compartments with the actual medication being taken by the filling in of the medication identification in the appropriate place in printed out text. When the present invention is operated so that the printer outputs the person's compliance or non-compliance with a medication regimen, the resultant record is extremely useful to permit refreshment of memory of whether each dosage of medication has been taken.

Further in accordance with the invention, for those persons who are particularly infirm, a memory is provided for storing the identity, number of dosages and time intervals between dosages for commonly prescribed medications which is utilized to automatically program the time intervals for taking these commonly prescribed medications in response to the person's causing a coded message to be read. This method of programming eliminates the requirement for manipulating many input controls and in conjunction with the other memory storage capability of storing the identity and time of taking particular medications permits an accurate monitoring system for the taking of medications under prescription which is not intimidating to persons who are either too infirm or otherwise too uncomfortable with inputting a program for taking individual prescription medications.

In one embodiment of the invention, the control program may generate a signal indicating that two or more successive dosages of the same medication have been missed. The record producing apparatus is activated by the control program to provide a message to the person taking the medication that two or more dosages have been missed and that a pharmacist or doctor should be consulted prior to taking the missed dosages.

In another embodiment of the invention, the identification of the medications being taken is made in the memory by the compartment number within which the medication is contained. However, a preprogrammed memory may be used to store the actual identification of numerous medications which are to be identified by their actual chemical or brand name which are addressed by a code such as a number that is inputted by an input device. The actual identification of the medication which is printed by the record producing apparatus is looked up in a table correlating a medication with its code. The code causes the actual medication identification to be retrieved from the preprogrammed memory and reproduced by the record producing apparatus whenever an output is generated regarding the identification of that medication.

In another embodiment of the invention, the record producing apparatus produces a record of medications to be taken on an as needed basis whenever an acknowledgment signal is generated by depressing the switch associated with each compartment containing the medication (or indicating the location where the medication is stored, e.g. refrigerator) to signal taking of the medication. Alternatively, in order to avoid false inputs from accidental depressing of the switches associated with the compartments, a separate operational mode may be provided which requires the person to change from a mode where alarms are given to signal that it is time to take medication to a mode for taking only medications on an as needed basis.

In a preferred embodiment of the invention, different operating modes are provided which differentiate between medications (1) to be taken at prescribed times, but which are taken on demand before the prescribed time that a dosage is to be taken, such as when a person will be away from home at the time that the dosage is to be taken and the dosage is taken prior to leaving, and (2) medications (as needed medications) which are not taken as part of a medication regimen at prescribed times, such as over-the-counter medications, etc. A separate operating mode is provided for taking medications of classification (1) above which produces a record that the medication was taken at the time that the acknowledgment switch was closed before the next dosage was programmed to be taken at a later time to generate an accurate record of compliance with a medication regimen. Further, in taking medication of classification (1) a record of the time the next dosage was to be taken is generated by a subroutine which is executed upon the entry into the mode for taking medications to be taken earlier on demand than the programmed time and for each dosage which is taken ahead of schedule, the subroutine disables the next alarm function for the time that the medication was programmed to be taken.

When medications belonging to class (1) are to be taken, the operation mode described below for checking the sequential scheduling of medications may be consulted prior to taking of a class (1) medication to enable a determination of the optimum to take the next dosage prior to the programmed time.

When medications belonging to class (2) are to be taken, common classifications of over-the-counter medications, e.g. pain relievers, cough and cold medications, vitamins, etc. may be assigned to particular compartments by each of the compartments being preassigned to the classification to which the medication belongs. The control program, when operated in the mode for the taking of medications of class (2), upon the taking of each dosage causes the record generating apparatus to print out from a preprogrammed section of memory the general classification of the medication along with the time and date of taking each dosage which are stored in random access memory each time an acknowledgment signal is generated.

In the preferred embodiment, a backup battery power supply is provided to maintain the programmed operation of the time base without alarm producing capability so that the programmed schedule for taking medication is not lost upon a power outage or transportation of the system between external sources of power such as when travelling or moving the system between electrical outlets or vehicles. Preferably, the backup power supply will not be used to operate the alarm or printing functions because of power requirements. The control program is provided with a subroutine which senses when power is disconnected from an external source after the system is placed in any of the normal operational modes during which medication is to be taken under control of the programmed timer. This subroutine senses when external electrical power resumes or is reconnected during the normal operational mode and activates the printer to provide a printout of the time and date when power was both interrupted and restored and an indication of any dosages of medication which were programmed to be taken during the power outage with a message that a physician or pharmacist should be consulted about the missed dosage(s).

The invention may also be used to monitor other vital signs of the person, such a blood pressure, blood sugar, pulse rate, weight and temperature and other types of devices for monitoring body parameters and medication. Preferably, a blood pressure measuring device, a pulse rate measuring device and a temperature measuring device is coupled to the memory for storing the time, date and value of each of the aforementioned vital signs as they are read by the person.

Further in accordance with the invention, the programmable timer may be programmed with the times of scheduled appointments with health care personnel such as visits to doctors. The record producing apparatus may be activated to print out a reminder prior to the scheduled visit (e.g. 24 hours and 2 hours before the scheduled visit) of the time of the scheduled appointment. Further, a visual indicator may be provided which is activated continually from the selected time of the first advance warning to the actual time of the scheduled visit that the record producing apparatus should be consulted for the time of the scheduled appointment.

Finally in accordance with the invention, the control program may monitor the number of dosages of refillable prescription medications which remain to be taken out of the total number programmed to be taken and activate the record producing apparatus to print a message that it is time to consider refilling the prescription and that a physician or pharmacist should be consulted regarding the refill.

BRIEF DESCRIPTION OF THE DRAWINGS

FIG. 5(*c*) illustrates a memory map of another section of the ROM of FIG. 4 which stores pertinent information about a medication regimen to be taken.

FIG. 5(*d*) illustrates a memory map of another section of the ROM of FIG. 4 which is used for generation of a record of compliance with a medication regimen.

FIG. 6 illustrates a memory map of the random access memory (RAM) of FIG. 4 which is used for storing the time and date of taking each dosage of each of the medications being taken by the person under the control of the timer and the information stored in each one of the addressable storage locations associated with a particular medication being taken.

DESCRIPTION OF THE PREFERRED EMBODIMENTS

Figures 1, 2:
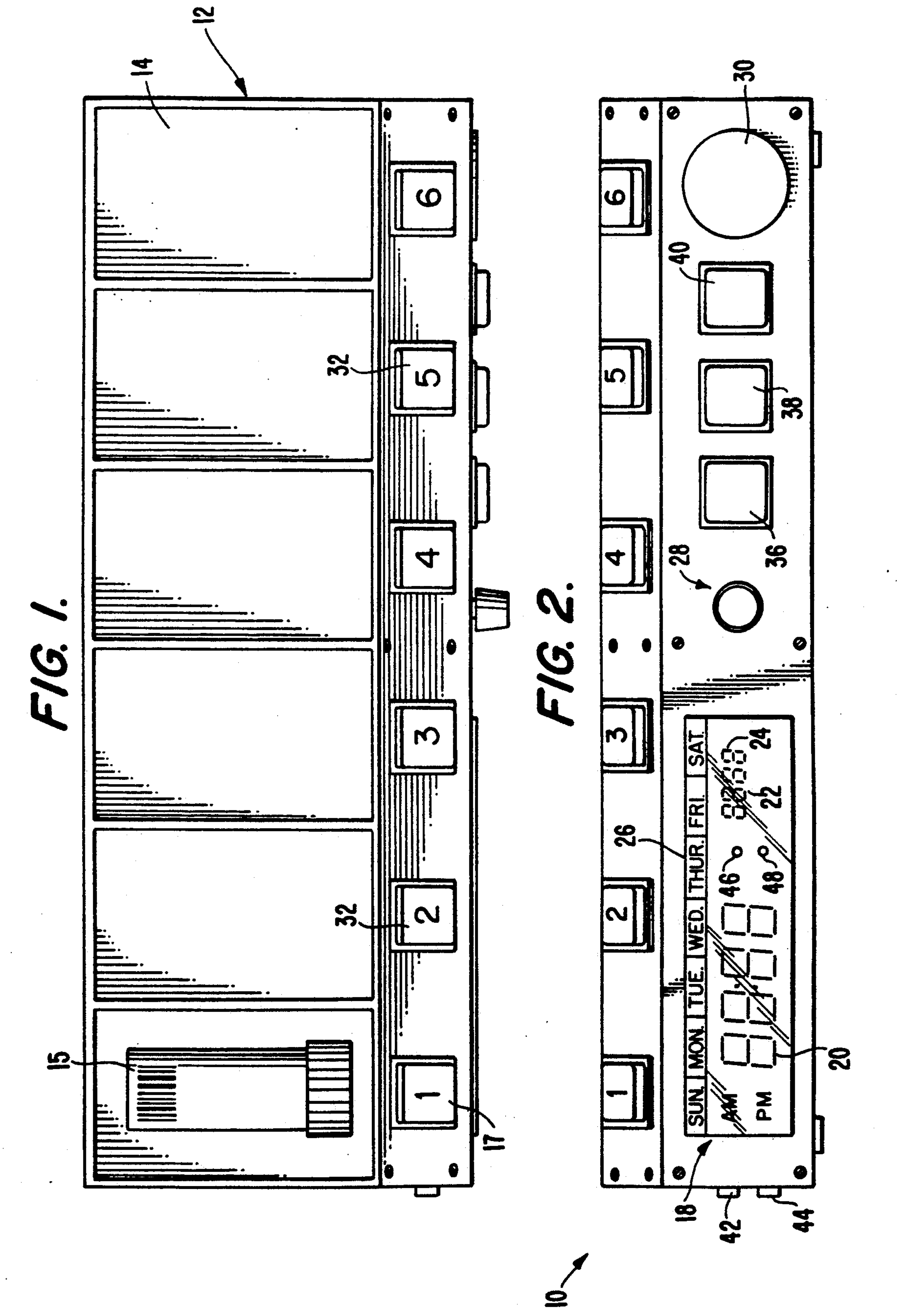
FIG. 1 is a top view of a medication timer in accordance with the invention.
FIG. 2 is a front view of a medication timer in accordance with the invention.

The present invention is an improved medication clock which provides a permanent record of a person's compliance or noncompliance with a medication regimen in which individual dosages are to be taken at prescribed times; provides a permanent record of the taking of each dosage of medication intended to be taken under, the control of the programmed timer which is taken on demand before the scheduled time and a message when the scheduled dosage was to be taken; provides a permanent record when each dosage of medication programmed to be taken under the control of the programmed timer is missed; provides a message after consecutive dosages programmed to be taken under the control of the programmed timer are missed advising that a health care professional should be consulted; provides a permanent record of when the present invention was not powered by external power source after the programmed operation of the taking of medications at scheduled times has been initiated and an identification of dosages of medication which were programmed to be taken during the time that external power was absent; provides a printout of information which facilitates the correlation of the actual identity of the medication being taken with the compartment within which the medication is stored; provides one or more messages advising of scheduled visits to health care personnel ahead of the scheduled appointment time; and provides a message prior to the taking of a last scheduled dosage of refillable prescriptions it is time to consult a physician or pharmacist about refilling the prescription.

The medication clock is programmable to signal the time for taking each dosage of a plurality of medications from a plurality of compartments and creates a record for subsequent review by an attending physician or other personnel of the person's history of taking each of the medications.

The programming of the identification of the medication to be taken, the number of dosages and the time of taking each dosage can be accomplished for commonly prescribed medications by the person's causing the reading of a code, which is the beginning address of a block of memory locations storing programming information, provided on or in conjunction with the prescription filled by the pharmacist. The coded address is used to fetch the requisite programming information from one of the memory blocks in a preprogrammed ROM to program the clock with a timed alarm for indicating that it is time to take each dosage of the medication. A preprogrammed memory and an input device may be used to enter the identification of actual medications into the record producing apparatus to cause the permanent record of compliance with a medication regimen to include the actual names of the medications being taken. A printout correlating the names of medications and the code is provided to permit the inputting by the input device of the code which accesses the identification of the medication stored in the preprogrammed memory which is to be used in the generation of the record.

Figure 3:
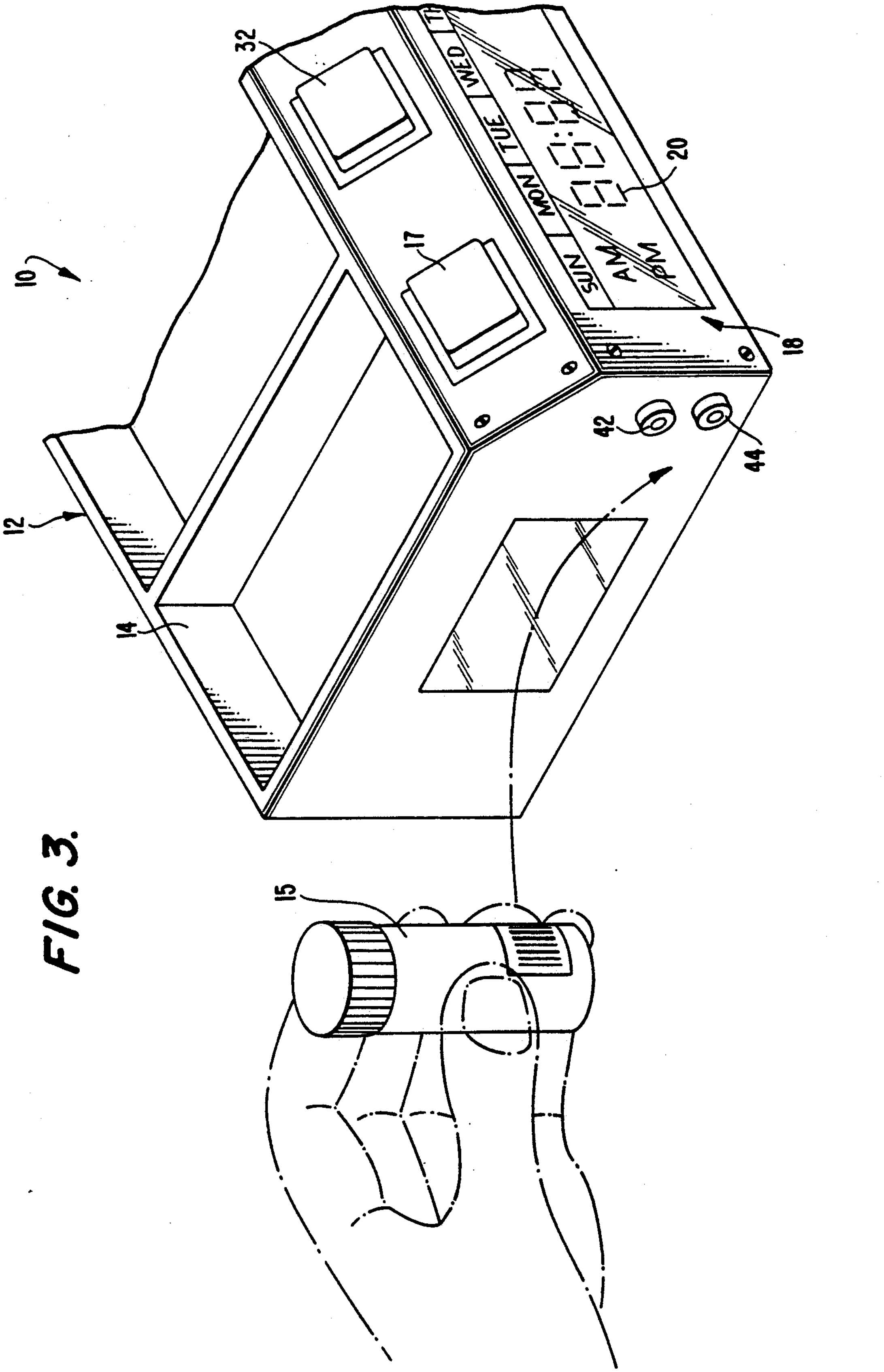
FIG. 3 is a side view of a medication timer in accordance with the invention.

FIGS. 1-3, respectively, illustrate top, front and side views of a medication clock 10 in accordance with the present invention. A housing 12 contains a plurality of compartments 14 each for the storage of one or more medications 15 which are dispensed at least in part under the control of a timer described in detail, below. The compartments are illustrated as open bins, but may be closable by appropriate closing devices. A number 17, which is associated with each compartment 14, is used to identify the compartment number and in one embodiment the identification of the medication in the data base which is described in detail, below. One or more of the compartments 14 may be used to store nonprescription medications and prescription medications taken on an as needed basis as described below. For example, the compartment 14 associated with the compartment identifying number "6" may store prescription medications to be taken as needed (the time of taking being under the control of the person taking or person assisting in the taking of the medication). The front face of the housing contains a clock 18 which provides an output of the time 20, the month 22, the date 24, and the day of the week 26. Any conventional microprocessor based clock which performs the aforementioned functions may be used with the present invention. A multiposition mode switch 28, which has separate positions, is used by the person to activate the various functional modes of the present invention. It should be understood hat alternatively, the multiposition mode switch 28 may be replaced with a numerical touch panel with two digits or other coding mechanism being utilized to designate the different modes. Finally, other mechanisms for inputting mode identification may be utilized in practicing the invention. The individual modes of operation which may be selected by the person are described in detail below in conjunction with the flowchart in FIGS. 7–12 of the microprocessor control program used for the present invention. An alarm controlled by the microprocessor based clock 18 is provided for notifying the person that it is time to take a particular medication or medications contained within one of the six compartments 14. The alarm preferably includes an audio tone generator which causes an audible tone to be emitted by speaker 30 and a visual indicator 32 in the form of a pulsating light which is in proximity to the compartment 14 within which the medication to be taken is stored at the time that the alarm is activated. Nonprescription medications, prescription medications to be taken on an as needed basis or medications which are taken on demand ahead of the time that they are programmed to be taken under the control of the programmed clock, which are stored in one or more of the compartments 14, are taken under the person's own actions without activation of the alarm.

As will be described in more detail below, the taking of nonprescription medications without the aid of the programmed clock and alarm and prescription medications, taken on an as needed basis and medications which are taken on demand ahead of their programmed time to be taken may be accomplished with two operational modes. The first operational mode is for the taking of only medications on an as needed basis which is selected by a separate position of the multiposition mode switch 28 or equivalent, which is distinct from the position used during the mode of operation of the system for the taking of medications in response to an alarm. The second operational mode is selected by a separate position of the multiposition mode switch 28 that permits the taking of only medications, which are programmed to be taken at specified times under the control of the programmed clock in response to an alarm, on demand ahead of schedule.

Each visual indicator 32 preferably is a light which pulsates as part of the alarm that it is time to take a particular medication or medications. An acknowledgment switch 34 (FIG. 4) is associated with each visual indicator 32 which is activated by the person taking the medication regimen. For medications which are taken in response to the alarm function, the acknowledgment switch 34 is activated by the person's touching of the pulsating visual indicator 32 to cause it to go off and the audio tone generator to cease operating. In the first operational mode discussed above for taking as needed medication, the multiposition mode switch 28 or equivalent must be positioned in a separate position distinct from the position for normal operation under the control of the programmed clock and alarm prior to the person signalling that an as needed medication has been taken by the depressing of an acknowledgment switch 34 associated with the compartment 14 containing the medication. In the second operational mode discussed above for taking medications on demand ahead of their programmed time, the multiposition mode switch 28 or equivalent must be positioned in a separate position, distinct from the position for operation under the control of the programmed clock and alarm and the position for taking as needed medications, prior to the person signalling that a medication is to be taken ahead of schedule by the depressing of an acknowledgment switch associated with the compartment 14 containing the medication. In these two operational modes of the taking of medications, the processing of the acknowledgment signal produced by the depressing of an acknowledgment switch 34 by the control program is identical in that it causes the storage in the RAM 56 of the identification of the medication, and the time and date that the medication was taken for the purpose of updating the person's medication dosage history. When the multiposition mode switch 28 or equivalent is in the appropriate position as described below, the closing of a medication check switch 36 by the person causes the display of the next programmed time that medication is to be taken in conjunction with an identification of the respective medication compartment in which the medication to be taken is located by the activation of the associated visual indicator 32. The display of the subsequent times for taking each medication are produced by each subsequent closure of the medication check switch 36. A switch 38 is activated by the person to set either the hours or the month of the clock 18 depending upon the position of the multiposition mode switch 28 or equivalent as described, below, in the discussion of the microprocessor control program. A switch 40 is activated by the person to set either the date 24 or the minutes of the clock 18, depending upon the position of the multiposition mode switch 28 or equivalent as described, below. An entry switch 42 is located on the side of the housing 12 for entering the various inputs which have been set in the switches described, above. The entry switch 42 or equivalent may be used after entry of the time and day for taking each of the medications to further signal whether the medication is one which may be refilled. By signalling that a medication to be taken is one which may be refilled by a subsequent second depressing of switch 42, a subroutine is activated, which during the normal operational cycle of taking medications under the control of the programmed clock, activates a record producing apparatus which is printer 53 discussed below to print a message that a health care person should be consulted regarding the refilling of the prescription when a predetermined number of dosages of medication are left to be taken in the current prescription prior to the possible refilling. A low battery test switch 44 is also located on the side of housing 12 which is activated by the person to determine if the batteries have discharged to a point where they should be replaced. Low battery indicator 46 is activated when the battery has discharged to a point requiring replacement. Program indicator 48 signals that the programming of the alarm functions has been completed when the multiposition mode switch 28 or equivalent has been switched to mode 0 as described, below, in conjunction with the flowchart. A code reader 50 (FIG. 3) is located on the side of housing 12 which is provided for reading an encoded beginning memory address of a block of memory used for storing information used for programming the alarm function which is encoded on or in conjunction with a prescription which is to be dispensed under the control of the present invention. The code reader may be a commercially available unit such as the Intermoc Model 9300, Part 039253, for reading the universal bar code used in conjunction with the identification of numerous products for purposes of merchandising. A record forming device, such as a printer 53 (FIG. 4), is provided for printing information from the data base contained within the ROM 56 and RAM 58 described, below, for the purpose of forming a permanent record of the identification, time, and date of taking of each dosage of the prescribed medications, including prescription medications and nonprescription medications taken on an as needed basis and medications taken on demand ahead of their programmed schedule and the printing of other information to facilitate the making of a complete record of compliance with a medication regimen or to insure that the person is complying with the medication regimen, the times of scheduled appointments with health care personnel, and that prescription medications which may be refilled should be considered for refill. The connection to the printer from the memory may be an RS232 interface to permit the coupling of a standard printer 53 to the RAM 58 for generating a permanent history of compliance with the taking of medication regimens. It should be understood that the various switches and other functions contained in the housing 12 may be relocated without departing from the present invention.

Figure 4:
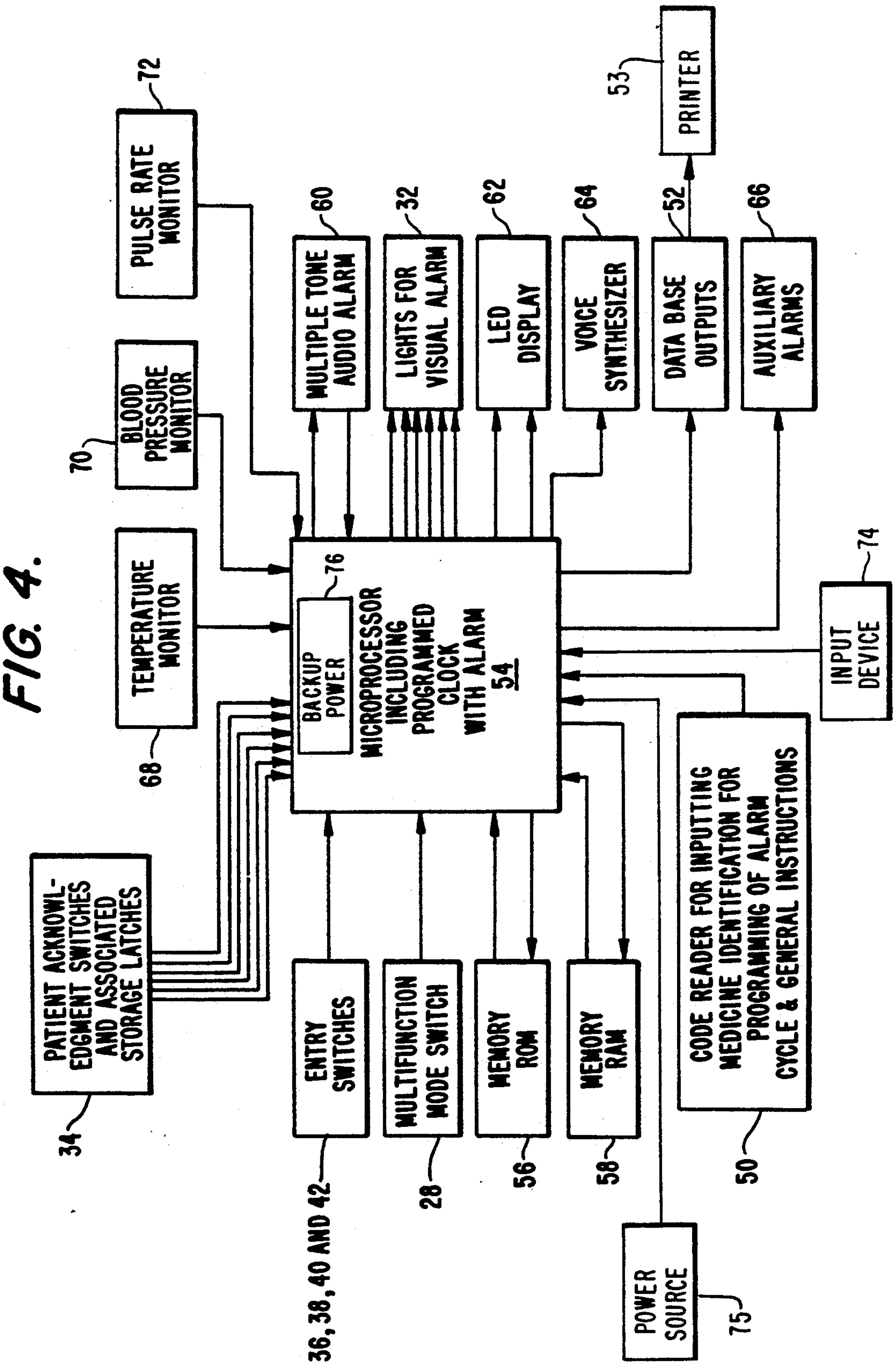
FIG. 4 is an electrical schematic of the present invention.
Figure 5A:
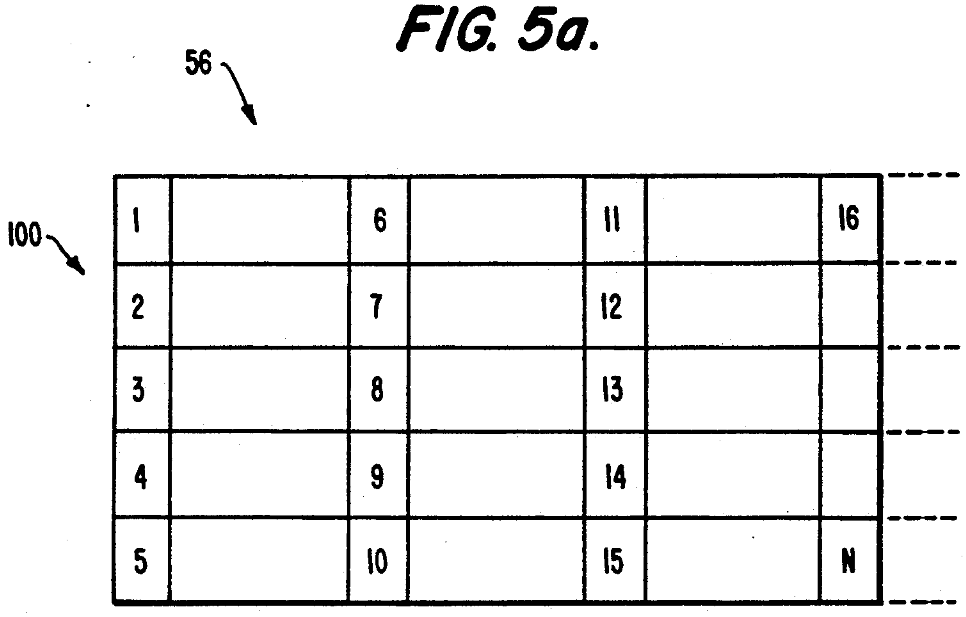
FIGS. 5(*a*) and 5(*b*) respectively illustrate a memory map of the ROM of FIG. 4 and the information stored in a single addressable storage block of the ROM.
Figure 5B:
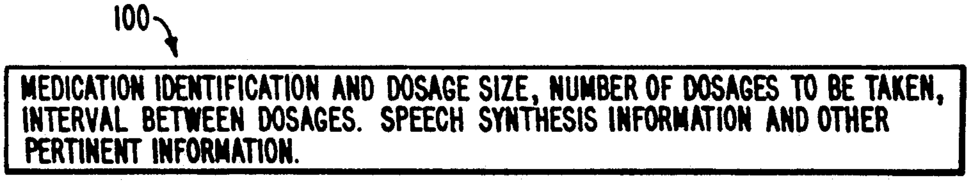
Figure 5C:
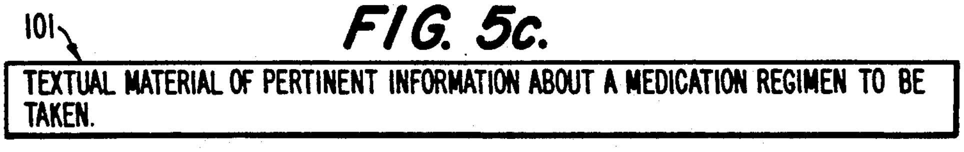
Figure 5D:
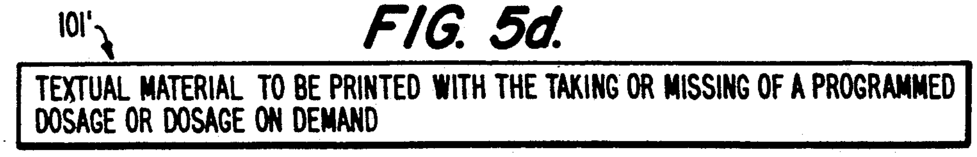
Figure 7:
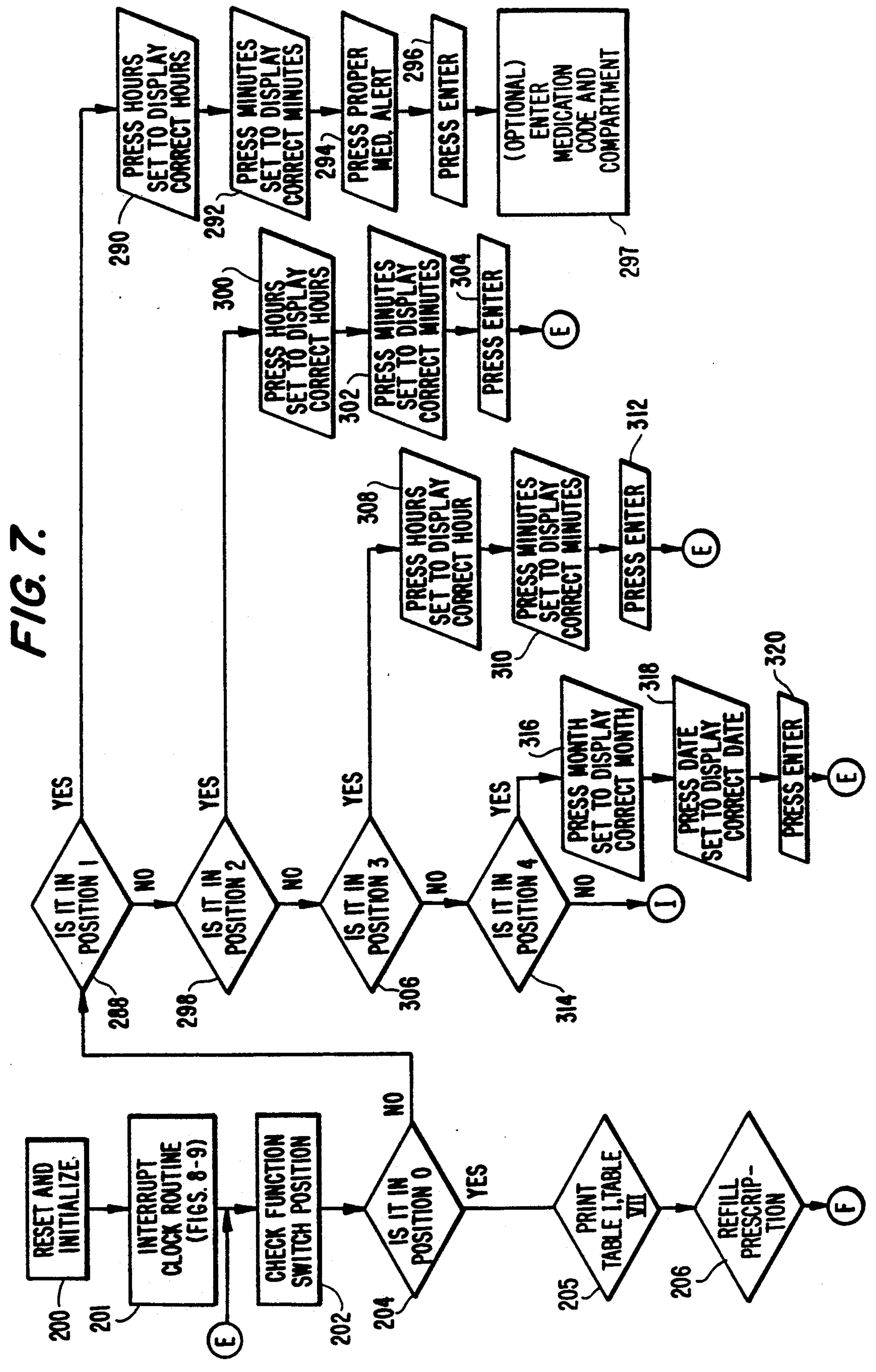
FIGS. 7-12 illustrate a flowchart of the preferred form of microprocessor control program used with the present invention.
Figure 8:
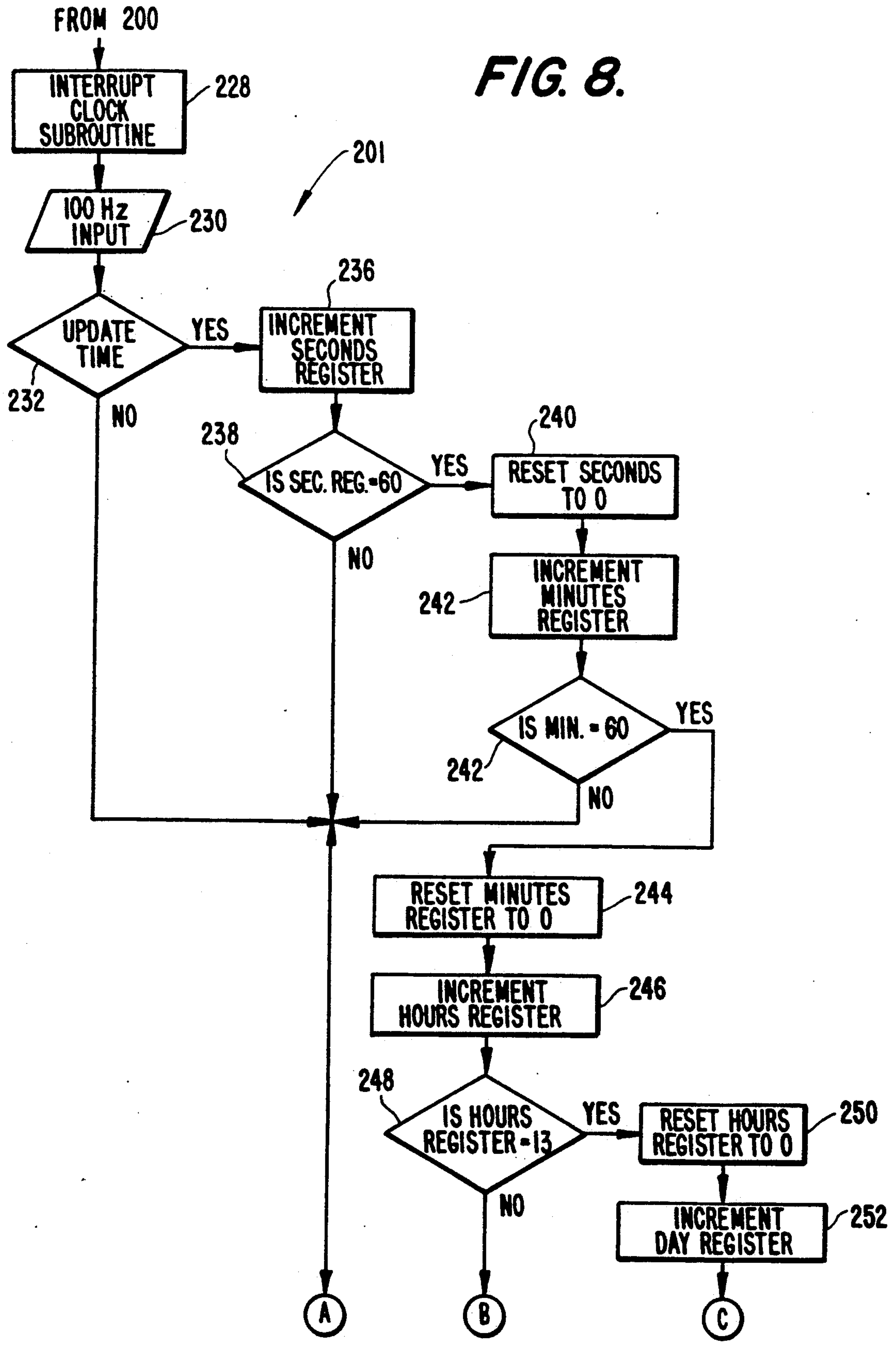
Figure 9:
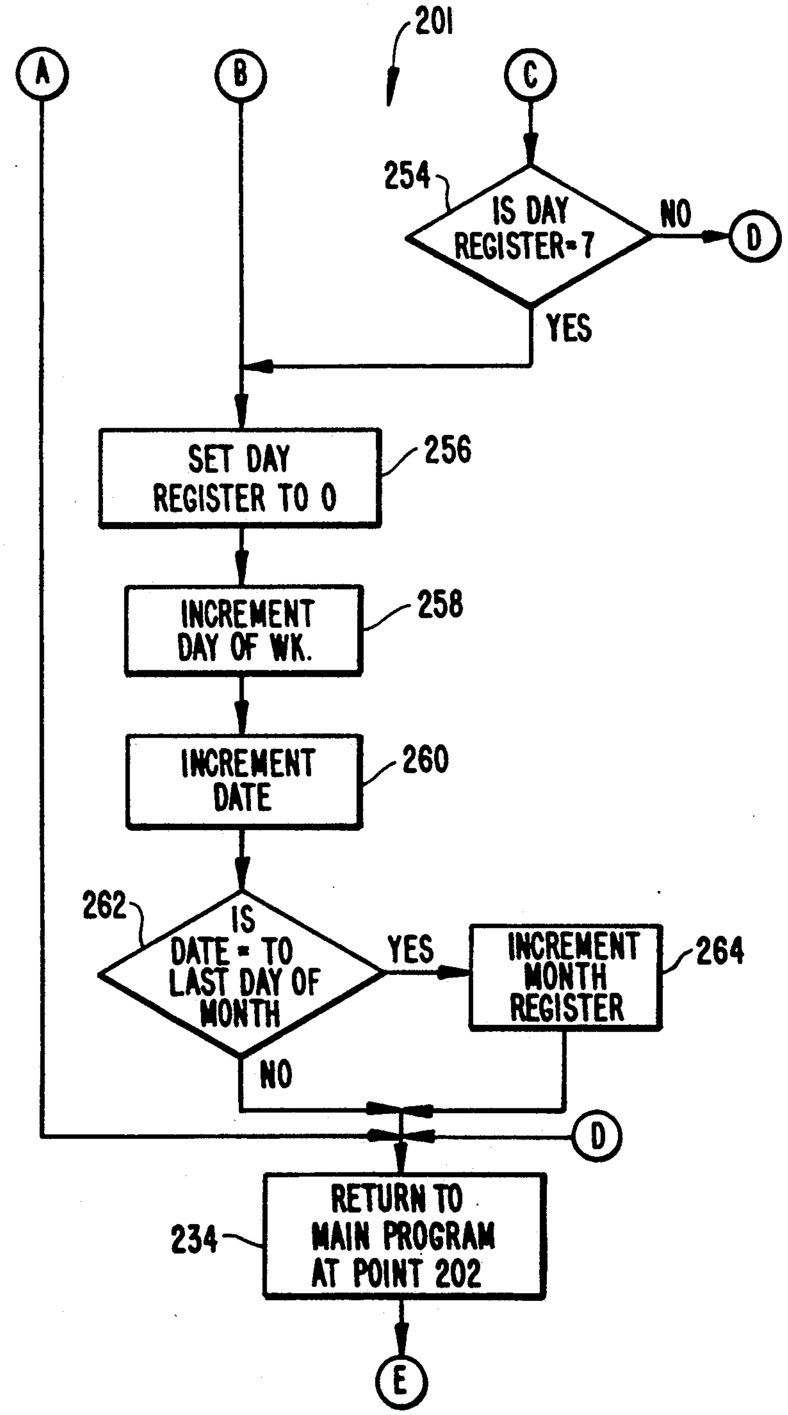
Figure 10:
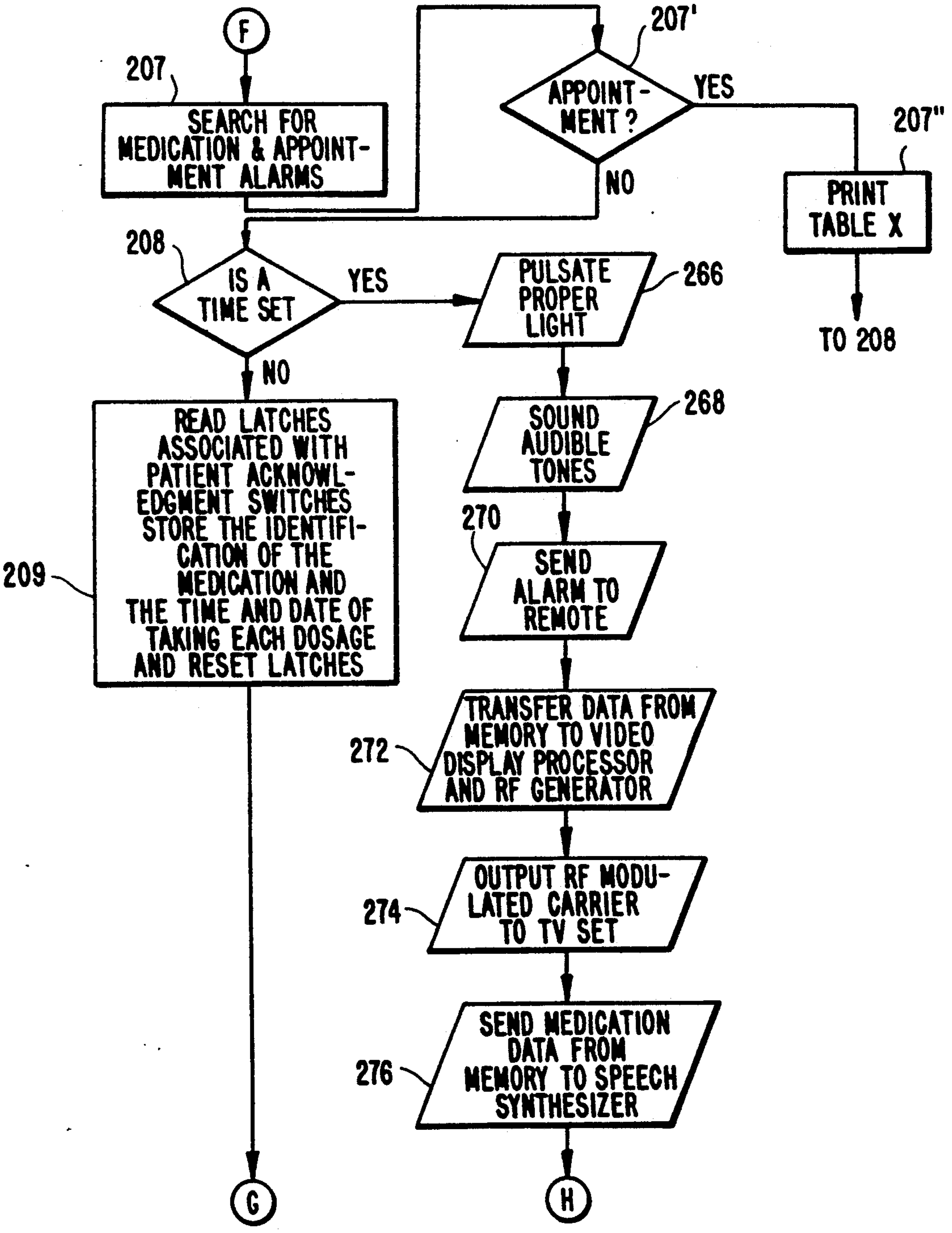
Figure 11:
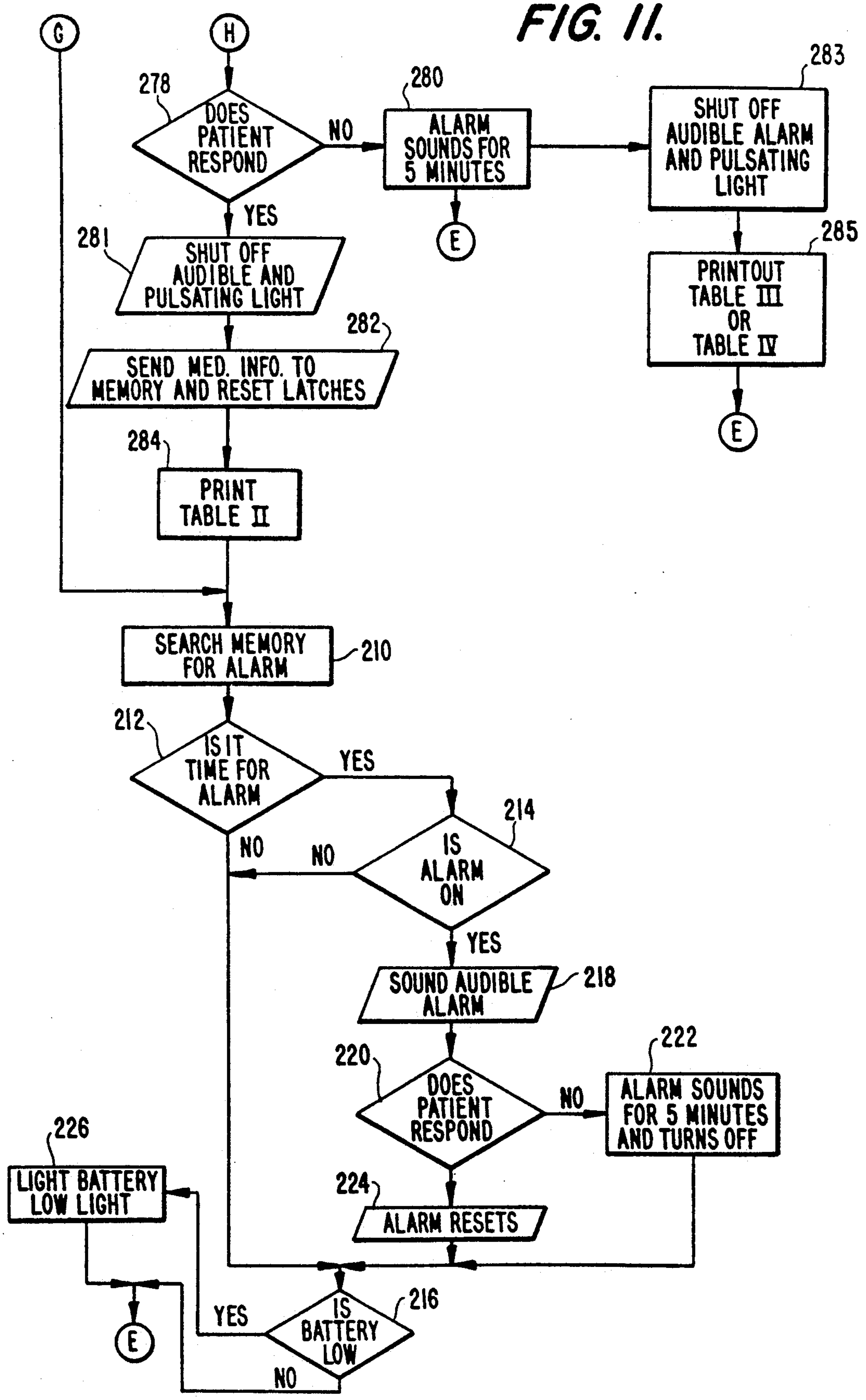
Figure 12:
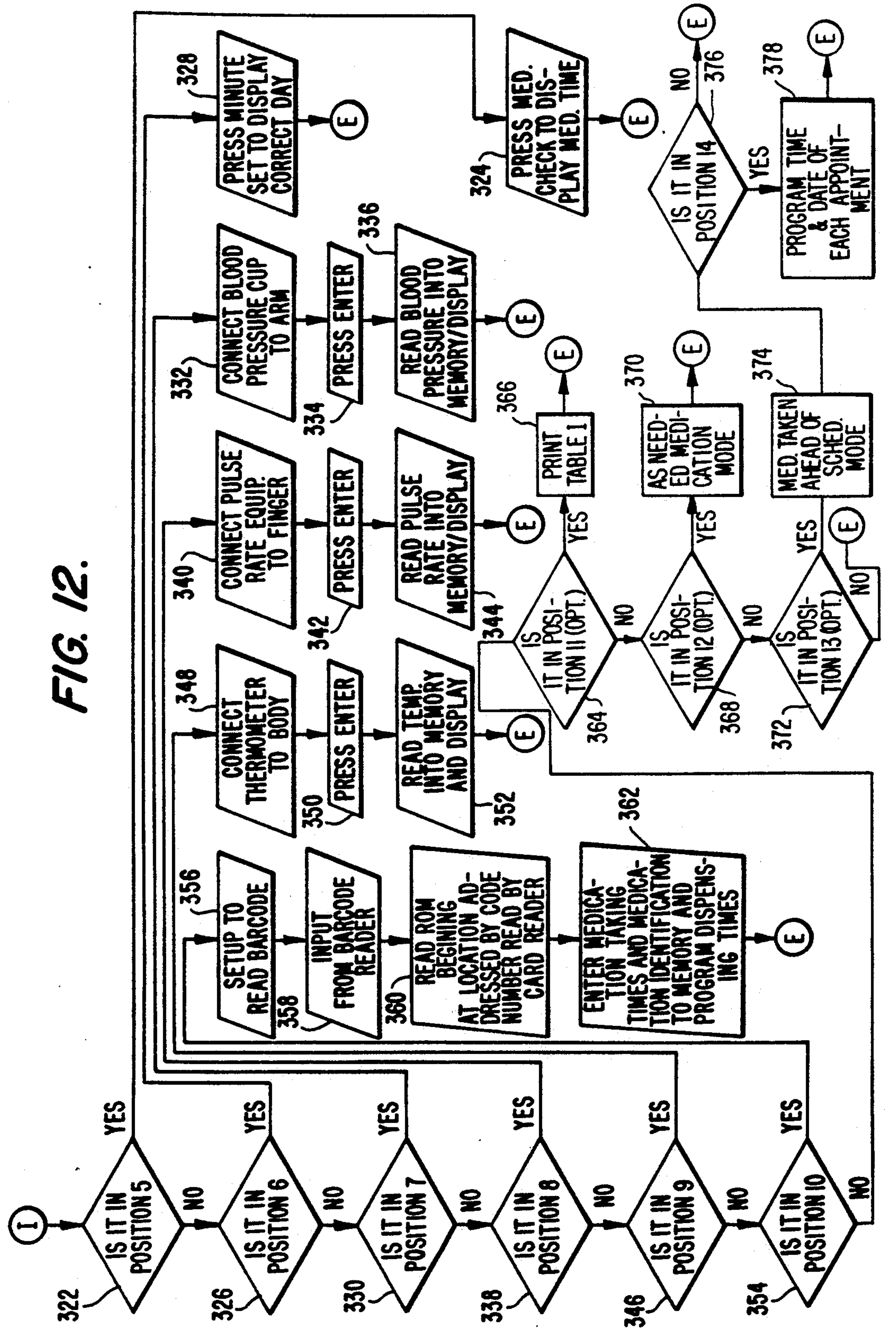

In the preferred form of the invention, the printer 53, described below in conjunction with FIG. 4, is an integral part of the system which is contained within the housing 12. The printer outputs records during various phases of the operation of the system which are described below in conjunction with Tables I–X. The generation of forms to be used for filing in pertinent information about the medication regimen to be taken and correlating the actual identification of the medication with the compartment containing the medication facilitates the operation of the system by the person taking medication in providing a printed form to record pertinent information about a medication regimen such a the generic and/or brand name of the medication, the compartment 14 within which the medication is to be stored, the strength of the medication (e.g. how many milligrams per capsule or tablet), dosage (e.g. the number of tablets or capsules to be taken at a time) frequency (number of times a day the medication is to be taken or number of hours between dosages), the prescribing physician, purpose of taking the medication (e.g., blood pressure regulation) and schedule (e.g. the different times each day the medication is taken such as 9 a.m. and 3 p.m.). It should be understood that other types of information may be printed by the printer. Additionally, the printer 53 performs the important function of providing the person taking the medication with a record provided each time a dosage is taken or missed which is extremely valuable in creating a permanent record of compliance. The generation of a record each time a dosage of a particular medication is missed including an identification of the medication and the time and date permits a determination if a dosage has been forgotten at a later time. Furthermore, the control program may cause the printer 53, as discussed below, to print a message that two or more successive dosages have been missed and that appropriate action should be taken such as consulting a physician or pharmacist. The control program may cause the printer to print a message when the present invention has been disconnected from an external power source and reconnected and a message identifying dosages which should have been taken while external power is disconnected. The control program may also cause the printer to print one or more messages prior to a scheduled appointment with health care personnel of the time and date of a scheduled visit. Finally, the control program may cause the printer 53 to print a message that a prescription medication, which is refillable, is to be considered for refill in advance of the time of taking of the last scheduled dosage within the prescription.

FIG. 4 illustrates an electrical schematic of the present invention. A programmed microprocessor including a clock with a programmable alarm 54 is used for controlling the programmable functions of the present invention. Any conventional microprocessor may be used in the programming of the control functions of the present invention as described, below, in conjunction with FIGS. 7–12. The multiposition mode switch 28 or equivalent is selectively located in any one of a plurality of positions to activate the different functional modes of the operation and programming of the present invention. The details of the usage of particular switch positions or equivalents to operate different modes of the invention are described in detail, below, in conjunction with the flowchart of FIGS. 7–12. Entry input switch 42 is depressed by the person to enter data for programming purposes for the various modes described, below, in conjunction with the flowchart and may be depressed a second subsequent time to activate the function of printing a message regarding the refilling of the prescription. A ROM 56 (read only memory) is connected to the microprocessor 54 for providing preprogrammed information for programming the dosage, times and number of dosages of commonly prescribed medications, speech synthesis data and the initial time and date information when the clock function is first activated and storage of textual information to be printed out by the printer 53 including the above-described pertinent information. The details of the information stored in the ROM 56 are described, below, in conjunction with FIGS. 5(*a*) and 5(*b*). A RAM 58 (random access memory) is connected to the microprocessor 54 for storing the data base of the person's history of taking medications being dispensed under the control of the invention. In addition, the RAM 58 stores other variable data used for the programming of the times for activating and operation of the alarm function of the present invention. Preferably, a total of six acknowledgment switches 34 (one assigned to each compartment 14) are each respectively associated with a different one of the compartments 14 for signalling the microprocessor 54 that a particular one of the medications being taken under the programmed clock or under the person's own volition (nonprescription or prescription medications taken as needed or medications taken on demand ahead of the programmed time) has been taken. Associated with each acknowledgment switch 34 is a latch, such as a flip flop, which stores the acknowledgment signal until read and reset by the microprocessor 54. The latches perform the function of storing all acknowledgment signals, including those generated in response to the signaling of an alarm and those which are generated by the person, when prescriptions are taken on an as needed basis or nonprescription medications which are stored in the compartments 14 are also taken on an as needed basis. As has been described, above, the individual switches 34 are located in proximity to the compartment 14 which contains the medication being taken, and are activated to cause the entry into the data base stored in the RAM 58 of the identification of the medication and the time and date at which the medication was taken for purposes of providing a permanent data record of the person's history of taking the prescribed medications. The code reader 50 is connected to the microprocessor 54 to provide an input of the beginning address of a block of memory in the ROM 56 at which the identification, number of dosages, and the time between which each dosage is to be taken for commonly prescribed medications and speech synthesis information used for synthesizing a speech message, including medication identification and dosage instruction, are found. Preferably, the code reader 50 is designed to read the universal bar code. The activation of the code reader 50 is under the control of the multiposition mode switch 28 or equivalent and is described, below, in conjunction with FIG. 12. A multiple tone audio alarm 60 is activated by a medication dispensing signal which is generated when the programmed time for signaling the dispensing of medicine agrees with the actual time of the clock 20. The multiple tone audio alarm contains the speaker 30 described, above. Preferably, the multiple tone audio alarm generates a tone which cycles smoothly between low and high frequency to produce an easily heard audio alarm for even those persons who have difficulties in hearing. The details of the circuitry for producing the tone which smoothly cycles between low and high frequency are in accordance with well known oscillator circuitry. For medications taken under the control of the programmed clock, the microprocessor 54 also activates one of the visual indicators 32 which identifies the compartment 14 within which the particular medication or medications which are to be taken are located. The individual indicators 32 are pulsated to make them easily visible to the person. The pulsation of the lights is driven by a relaxation oscillator or other type of oscillator which is keyed into operation by the aforementioned medication dispensing signal generated when the actual time is in agreement with the programmed time for taking a particular medication or medications. The microprocessor 54 drives an LED, LCD or other type of display 62 for indicating the time 20, month 22 and date 24 as described in conjunction with FIG. 1, above. In addition, the day 26 is activated by a single light which is not illustrated. A voice synthesizer 64 is activated by the generation of the aforementioned medication dispensing signal to provide a suitable voice synthesized message to the person. In the mode of operation where the person manually programs each of the times when the medications are to be taken, the voice synthesized message is preferably a vocal statement to the effect that "it is time to take the medication in compartment number _". When the dispensing times are programmed in accordance with the mode of operation using the code reader 50 to cause the programming of the identification, number of dosages and time for taking the dosages with information from the ROM 56, the voice synthesizer 64 states that it is time to take medication and further states the general instructions for taking the medication including identification of conditions for taking the medication with regard to mealtimes, etc. and further the location of the medication if it must be obtained from a location other than the compartments 14 such as a refrigerator. Data base output 52 is coupled to the RAM 58 through the microprocessor 54 to permit the reading of the person's accumulated dosage history of taking prescribed medications, including medication on an as needed basis and nonprescription medications. The data base output 52 may be in many different forms and can be the aforementioned RS232 interface for a printer 53 contained within the housing 12. The output may take any well known form. Additionally, one or more auxiliary alarms 66, which are activated by the aforementioned medication dispensing signal, may be provided for further signalling the person that it is time to take medication. The auxiliary alarms are particularly useful when the person is hard of hearing, is not in visual contact with the indicators 32 or is located in a remote location. Without limitation, the axiliary alarms may be a message generator for producing a message to be displayed on the bottom of the person's television screen that it is time to take mediation, an audio message to be generated on the person's radio or stereo system, an audio message to be produced by a paging system or a transmitter for producing a signal to activate a remote alarm. Circuitry for implementing each of these auxiliary alarms is known. A temperature monitor 68 is coupled to the microprocessor 54 for providing temperature data, including the temperature reading and time and date of taking the temperature reading for storage in the RAM 58. A blood pressure monitor 70 is coupled to the microprocessor 54 for providing blood pressure data, including the blood pressure reading and time and date of taking of the blood pressure reading for storage in the RAM 58. A pulse rate monitor 72 is coupled to the microprocessor 54 for providing pulse data, including the pulse rate and time and date of taking of each pulse rate reading for storage in the RAM 58. Although not illustrated in FIG. 4, a scale with digitized output, a blood sugar monitor with digitized output, and a cholesterol monitor with digital output may be connected to the microprocessor 54 to utilize the memory storage capability and printer 53 to provide a permanent record of these body parameters. An input device 74 may be provided for entering information such as the codes which are entered by optional step 297 of FIG. 7 described below. A power source 75, which may be either an AC or DC source provides external power to the various parts of the system. External power source 75 provides the operating power for the entire system when connected. A backup power supply 76 in the form of a battery is provided which provides operating power for the control program which is operated by the microprocessor 54 but in a preferred embodiment is not used for powering the alarm and record producing functions because of the typical large current consumptions of these devices. The input from the external power supply is monitored by the microprocessor as described below in conjunction with FIG. 7 at point 205 to control the printing of Table 7 by the printer 53.

FIGS. 5(*a*) and 5(*b*) illustrate the blocks of information 100 stored in ROM 56 used for programming the times that each dosage of a medication is to be taken, etc. The portion of the ROM 56 used for the general operating system and specifying initial conditions of the clock 18, etc, is not illustrated. FIG. 5(*a*) illustrates a memory map of the individual blocks of programming information 100 of ROM 56. The ROM 56 contains a plurality of addressable storage blocks 100 of information which each have a distinct beginning address which is addressed by the address code detected by the code reader 50. Each storage block 100 has a sufficient number of individual bits to permit the storage of the information described in conjunction with FIG. 5(*b*). FIG. 5(*b*) illustrates the information which is typically stored in each of the individual storage blocks 100 although other information may be stored. Contained in each storage block 100 is the identification of the medication which is typically one of the commonly available prescription medications to be taken which has individual dosages automatically programmed by the present invention by the reading of the address by code reader 50. The information used for forming a speech synthesized message which is produced by voice synthesizer 64, the number of dosages to be taken and the time interval between dosages is also stored at each block 100. Programming of the times for the activation of the alarm to signal the taking of any of the medications which have information stored in the addressable storage locations 100 of FIG. 5(*a*) is accomplished under the control of the microprocessor in response to the reading of the beginning address by the code reader 50 of the particular block 100 associated with the medication to be taken in the manner described, below. It is within the scope of the invention to store other pertinent data in the preprogrammed storage locations of FIG. 5(*a*).

FIG. 5(*c*) illustrates the area 101 of the ROM memory 56 which is allocated to the storage of textual information used for printing out information about a medication regimen to facilitate the generation of a permanent record and which correlates the actual identification of the medication with the compartment number within which the medication was stored. It should be understood that this information may either be printed out upon the initial entry into mode 0 as defined by the multiposition mode switch 28 or equivalent as discussed in conjunction with FIG. 7 below or by entry into a separate mode and appears on the top of the record outputted by the printer 53. This information generates a document format with appropriate text to facilitate the person recording specific information about a medication regimen to be taken which is not stored in the ROM 56 and the correlation of the actual identification of the medication being taken with the compartment within which it is stored.

FIG. 5(*d*) illustrates the area 101′ of the ROM memory 56 which is allocated to the storage of messages to be printed during the operation of the invention to generate a record of a person's compliance with a programmed regimen for taking a medication.

One form of the information of FIG. 5(*d*) is given in Table I below. The sets of parenthesis "(DATE)" and "(TIME)" indicate data to be retrieved from the RAM 58. The other information in parenthesis indicates data to be filled in by the person taking or assisting in the medication regimen.

TABLE I

| | |
|---|---|
| (DATE) | (TIME) |
| FILL IN YOUR MEDICATION DATA | |
| COMPARTMENT #( ) | |
| MEDICATION IDENTIFICATION | |
| (____________) | |
| STRENGTH | (__________) |
| DOSAGE | (__________) |
| FREQUENCY | (__________) |
| PHYSICIAN | (__________) |
| PURPOSE | (__________) |
| SCHEDULE | (__________) |

As stated above, this textual information may be printed out either upon the initial entry into mode 0 or upon the entry into a separate mode by the positioning of the multiposition mode switch 28 or equivalent mode selecting device. It should be understood that the invention is not limited to the aforementioned text with the storage of other textual information about a medication regimen being within the scope of the invention. The information of Table I performs the important function of correlating the actual medication identification with the compartment which is to contain the information. Without the printout of Table I in which the user supplies the correlation of the actual medication identification with the storage compartment storing the medication, the printout of Tables II–IX would not enable a permanent record of the actual medications which are being taken to be generated because the reference merely to a compartment number does not permit the identification of the actual medication at a later date. The time in the control program of FIGS. 7–12 when this message is printed is discussed below.

Another form of the information of FIG. 5(*d*), which is printed each time a person takes a dosage under the control of the programmed clock 54, is given in Table II below with a set of parenthesis indicating variable data to be retrieved from RAM 58.

TABLE II

| | |
|---|---|
| (DATE) | (TIME) |
| MEDICATION IN COMPARTMENT # | |
| ( ) TAKEN | |

It should be understood that other forms of this textual message may be utilized with the invention. The time in the control program of FIGS. 7–12 when this message is printed is described below.

Another form of information of FIG. 5(*d*) which is printed when a person does not take a medication dosage in response to an alarm generated by the programmed clock 54 is given in Table III below with a set of parentheses indicating variable data to be retrieved from RAM 58.

TABLE III

| | |
|---|---|
| (DATE) | (TIME) |
| MEDICATION IN COMPARTMENT # | |
| ( ) NOT TAKEN | |

It should be understood that other forms of this textual message may be utilized with the invention. The time in the control program of FIGS. 7-12 when this message is printed is described below.

Additionally, when two consecutive medication dosages are missed, the information of FIG. 5(*d*) may take the form which is given in Table IV with a set of parenthesis indicating variable data to be retrieved from the RAM 58.

TABLE IV

| | |
|---|---|
| (DATE) | (TIME) |
| MEDICATION IN COMPARTMENT # | |
| ( ) HAS NOT BEEN TAKEN | |
| FOR ( ) CONSECUTIVE DOSAGES. | |
| CALL YOUR PHYSICIAN OR PHARMACIST. | |

It should be understood that other forms of this message may be used. To implement this function, the control program may use a counter associated with each compartment which is augmented each time a dosage in that compartment is missed. When a dosage is taken from that compartment, the counter is reset. When any one of the counters reaches a count of two and for each additional missed dosage, the message of Table IV is printed out. The time in the control program of FIGS. 7-12 when the message is printed is discussed below.

Another form of the information of FIG. 5(*d*) which is printed is when medications are taken on an as needed basis is given in Table V below with a set of parenthesis "(DATE)" "(TIME)" and "( )" indicating variable data to be retrieved from RAM 58 and the set of parenthesis "(General Medication Classification)" identifying prestored medication classifications discussed below in detail. A separate mode of operation is preferably utilized for the taking of as needed medications which is entered by the positioning of the multiposition mode switch 28 or equivalent.

TABLE V

| | |
|---|---|
| (DATE) | (TIME) |
| (General Medication Classification) | OTC |
| STORED IN COMPARTMENT # ( ) TAKEN | |

The term "OTC" is an abbreviation for "over-the-counter". The time in the control program of FIGS. 7-12 when the message is printed is discussed below.

In the as needed mode, general medication classifications are assigned to different compartments and stored in the ROM 101'. For example, all of the compartments 14, except one, may have particular classifications assigned such "pain reliever" "cough and cold medications", etc., so that the activation of an acknowledgment switch 34 in association with a compartment will print out the preassigned medication classification assigned to that compartment when operating in the as needed mode.

In the preferred form of the invention during operation in the as needed mode, one more of the compartments 14 may be preassigned to store miscellaneous medications which do not fall within the category of the preassigned classification. When an acknowledgment switch 34 associated with one of these "miscellaneous" compartments is closed, the information given in Table VI below is printed with the parenthesis "(DATE)", "(TIME)" and "( )" representing variable data to be retrieved from the RAM 58 and the "Miscellaneous" text being retrieved from the ROM. The printout of Table I above may be used to correlate the actual identification of the as needed medications with the compartment which stores them.

TABLE VI

| | |
|---|---|
| (DATE) | (TIME) |
| MISCELLANEOUS | |
| STORED IN COMPARTMENT # ( ) TAKEN | |

The time in the control program of FIGS. 7-12 when the message is printed is discussed below.

Another form of the information of FIG. 5(*d*) which is printed is when medications are to be taken under the control of the programmed clock and the medication clock is disconnected from a source of external power. As explained above, a backup battery power supply is provided to operate the programmed clock which does not have sufficient power to operate the alarm and indicators. A subroutine is provided to identify the dosage(s) of medication which were missed during the disconnection from an external power supply. When the external power is reconnected, the text of Table VII is printed out where the "(DATE)", "(TIME)" are information retrieved from the RAM 58 which is generated by a subroutine described below.

TABLE VII

| | |
|---|---|
| (DATE) | (TIME) |
| POWER INTERRUPTION | |
| (DATE) | (TIME) |
| POWER RESTORED | |
| MEDICATION IN COMPARTMENT # ( ) | |
| WAS SCHEDULED TO BE TAKEN DURING | |
| POWER INTERRUPTION, CONSULT YOUR | |
| PHYSICIAN OR PHARMACIST. | |

The time in the control program of FIGS. 7-12 when the message is printed is discussed below.

Another form of the information of FIG. 5(*d*) which is printed is when one or more dosages are taken on demand ahead of schedule. A separate mode of operation is provided which causes the printer to be activated to print out the information of Table VIII below with information in parenthesis being obtained from the RAM 56.

TABLE VIII

| | |
|---|---|
| (DATE) | (TIME) |
| MEDICATION IN COMPARTMENT # ( ) | |
| TAKEN AHEAD OF THE SCHEDULED TIME | |
| OF ( ). NO FURTHER INDICATION | |
| OF SCHEDULED DOSAGE TIME WILL APPEAR. | |

The control program disables the alarm function for the dosage(s) which was taken ahead of schedule so that a double dosage is not taken. The time in the control program of FIGS. 7-12 when the message is printed is discussed below.

Another form of the information of FIG. 5(*d*) which is printed is when a refillable prescription medication, which is being taken under the control of programmed clock, should be considered for refill to avoid the missing of dosages because of running out of medication. When a refillable prescription medication taken under the control of the programmed clock is identified as being refillable by the second subsequent depressing of switch 42, a message is printed out by the printer as set forth below in Table IX which advises that the prescription will require refilling.

TABLE IX

| | |
|---|---|
| (DATE) | (TIME) |
| MEDICATION IN COMPARTMENT # ( ) | |
| WILL RUN OUT ON (TIME) (DATE). | |

TABLE IX-continued

| |
|---|
| REFILLING OF PRESCRIPTION MAY BE OBTAINED. IF QUESTIONS EXIST ON REFILLING, CONSULT YOUR DOCTOR OR PHARMACIST. |

The first "(TIME)" and "(DATE)" represent the current time and date which is obtained from the RAM 58. The second "(TIME)" and "(DATE)" are the time and date of the last programmed dosage to be taken. The printing of the message may be activated by a subroutine which indicates when a predetermined number of dosages, such as four, remain to be taken which may be determined by subtracting the number of dosages taken, which is stored in RAM 58, from the total number of dosages programmed to be taken which is determined by evaluation of the programmed timer stored in the RAM 58. Alternatively, the printing of the message may be activated by evaluation of the programmed times and dates for taking the medication to determine the next to the last date during which the medication is to be taken and causing the printing of the message at some time during that date.

Another form of the information of FIG. 5(*d*) which is printed is a message advising of when a scheduled visit is to occur to a doctor or other health care personnel as set forth in Table X below.

TABLE X

| | |
|---|---|
| (DATE) | (TIME) |
| AN APPOINTMENT IS SCHEDULED TO VISIT HEALTH CARE PERSONNEL ON (TIME) AND (DATE). CONSULT YOUR APPOINTMENT SCHEDULE. | |

The first "(DATE)" and "(TIME)" is the current time and date which is obtained from the RAM 58. At the time of storage of the scheduled health care appointment as described below, the control program has a subroutine which determines the actual time(s) in advance of the scheduled appointment(s) at which the printing of Table X is to occur. The time(s) for activating the printing of Table X are then stored as actual alarm times. The activation of the printing of Table X is described below in conjunction with FIG. 10.

The information which is to be inserted in the areas set off by parenthesis in Tables II–VII is stored in the RAM 58 and is merged by the control program with the information stored in the ROM 56 when the printer 53 outputs the messages in accordance with Tables II–IV.

FIG. 6 illustrates a memory map of the RAM 58. The RAM 58 is used for the storage of the person's history of the taking of medications including those under the control of the alarm of the present invention. The RAM 58 may be provided with a plurality of memory blocks 102 which are at least equal in number to the number of compartments 14 contained in the housing 12 and in addition, provides storage for the temperature, blood pressure and pulse rate functions 68, 70 and 72, respectively described, above, with regard to FIG. 4 and other body parameters such as weight and glucose level. Each acknowledgment switch 34 may be associated with a particular memory block 102 to compile in that memory block the person's record of the taking of a particular mediation from the compartment associated with the associated acknowledgment indicator although other forms of memory allocation may be used. Additionally, the RAM 58 includes additional storage locations 104 for storing other information for programming or performing of the alarm functions including the programming of the particular dosage intervals either manually by the person or under the control of the automatic programming mode described with reference to FIGS. 5(*a*) and 5(*b*), above.

FIGS. 7–12 illustrate a flowchart of the microprocessor control program utilized by the microprocessor 54 described above with regard to FIG. 4. While the example described below is a software based clock, it should be clearly understood that the invention may also use a hardware based clock. It should be understood that any commercially available microprocessor may be used for implementing the control program described in conjunction with the flowchart. The program starts at point 200 where reset and initialization occurs. The program proceeds to point 201 where an interruption routine is entered for updating the time of the microprocessor based clock 18. The specific steps of the interruption routine 201 are discussed, below, with regard to FIGS. 8–9. The interruption routine is run at a basic rate of 100 Hz to update the clock function at a 100 Hz rate. The interruption program proceeds from point 228 to point 230 where a 100 Hz input is received which is the basic rate for updating the clock function. The receipt of each pulse causes the updating of the clock function to occur. The program proceeds to decision point 232 where a determination is made if a command has been received to update the time. If the answer is "no" at decision point 232, the program branches to point 234 where the program returns to the main program at point 202 to be described, below. If the answer is "yes" at decision point 232, the program branches to point 236 where a determination is made if a command has been entered to increment the seconds register. The program proceeds to decision point 238 where a determination is made if the seconds register is equal to 60. If the answer is "no" at decision point 238, the program branches to point 234 where the program branches back to point 202. If the answer is "yes" at decision point 238, the program proceeds to point 240 where the seconds register is set to zero. The program proceeds to point 242 where the minutes register is incremented by 1. The program proceeds to decision point 242 where a determination is made if the minutes register is equal to 60. If the answer is "no" at decision point 242, the program branches to point 234 where the program returns to the main program at point 202. If the answer is "yes" at decision point 242, the program branches to point 244 where the minutes register is set equal to zero. The program proceeds to point 246 where the hours register is incremented by 1. The program proceeds to decision point 248 where a determination is made if the hours register is equal to 13. If the answer is "no" at decision point 248, the program branches to point 234 where a return is made to the main program at point 202. If the answer is "yes" at decision point 248, the program branches to point 250 where the hours register is set equal to zero. The program proceeds to point 252 where the day register is incremented by 1. The program proceeds to decision point 254 where a determination is made if the day register is equal to 7. If the answer is "no" at decision point 254, the program branches to point 234 where a return is made to the main program at point 202. If the answer is "yes" at decision point 254, the program branches to point 256 where the day register is set equal to zero. The program proceeds to point 258 where the day of the week is incremented by 1. The day register is used for the activation of the display of the day at point 26 of FIG. 2. The program proceeds to point 260 where the date is incremented by 1. The program proceeds to decision point 262 where a determination is made if the date is equal to the last day of the month. If the answer is "yes" at decision point 262, the program branches to point 264 where the month register is incremented. The program proceeds then to point 234 where the program branches back to the main program at point 202. If the answer is "no" at decision point 262, the program branches to point 234 where the program branches back to the main program at point 202.

At the end of each clock function update cycle the program proceeds to block 202 to reenter the main program where the position of the multiposition mode switch 28 or equivalent of FIG. 2 is read. There are a plurality of mode switch positions or equivalents which are actually read in the different modes. Each switch position is used to call a subroutine which is described in detail, below.

The program proceeds to decision point 204 where a determination is made if the multiposition mode switch 28 or equivalent is in the zero mode. The zero mode provides a built-in safety feature which prevents tampering with the information which has been programmed into the microprocessor by the program modes described below. When the multiposition mode switch 28 is in the zero mode, the invention functions as programmed to provide alarms for indicating when one or more medications are to be taken under the program control while automatically entering the identity of the medicine taken, the time that it was taken and the date that it was taken into the RAM 58 in response to the depressing of the acknowledgment switch 34.

If the answer is "yes" at decision point 204, the program proceeds to point 205 which represents the activation of the routines for printing Tables I and VII discussed above. The subroutine for printing of Table I is optionally placed after point 204 in that its execution may alternatively be through an assigned position of the multifunction mode switch 28 or equivalent. If it is executed as part of mode zero, the text of Table I is printed by the printer 53 by reading the information of Table I which is stored in the ROM 56 upon the initial entry into the mode zero subroutine after programming of any new medication to be taken under the control of the programmed clock. The purpose of the text of Table I is to create a text which appears on the top of printout to correlate the actual identification of the medications being taken with the compartments storing the medication, as well as other pertinent information about a medication regimen to be taken, such as, but not limited to strength, dosage, frequency, the identification of the attending physician and the purpose of the medication. The subroutine for printing Table VII is entered only when the medication clock of the present invention has been disconnected from the external power source 75, which may be either alternating current or direct current, such as a 12 volt system found in motor vehicles, after the initial connection thereto and the activation of the programmed times. The determination that the external power source has been disconnected is made by monitoring the voltage level of the input for external power (AC or DC). A first flag is set upon disconnection from the external power after initial connection thereto and operation in any of the normal modes of operation. The setting of the first flag causes the top "DATE" and "TIME" of Table VII to be stored in the RAM 58. A second flag is set when the external power source is reconnected which causes the bottom "DATE" and "TIME" of Table VII to be stored in RAM 58. The setting of the second flag also causes a search to be made of the RAM 58 to fetch the programmed alarm times for testing if any of the medications should have been dispensed by the generation of an alarm while the external power source was disconnected and a printout to be made of any missed dosages.

The program proceeds to point 206 where a determination is made if it is time to print a message in accordance with Table IX for any of the medications which have refillable prescriptions that it is time to consider refilling the prescription. As described above, the determination may be based upon an identification of a predetermined number of dosages which are left to be taken from the total number of programmed dosages or from a determination of the date immediately preceding the date that the last dosage is to be taken. Also, other criteria could be utilized for activating the printing of the message of Table IX.

The program proceeds after decision point 206 to point 207 where the programmed alarm times are retrieved from the RAM 58. The program then proceeds to decision point 207' where a determination is made if the alarm is for an appointment and matches the current time. If the answer is "yes" at decision point 207', the program proceeds to point 207" where the message of Table X is printed and the program proceeds to point 208. If the answer is "no" at decision point 207', the program then proceeds to decision point 208 where a determination is made if in fact any of the fetched alarm times for indicating the dispensing of medication matches the current time. If the answer is "no" at decision point 208, the program proceeds to point 209 where each of the latches associated with the acknowledgment switches 34 is read. If any of the latches has been set, the identification of the medication in the compartment 14 associated with the medication which has been taken and the time and date of taking each dosage is stored in the appropriate block 102 of the RAM 58. The latches are reset after they are read and the data has been stored in the RAM 58. The program proceeds to point 210 (FIG. 11) where a search is made of RAM 58 to determine if the general alarm function of the clock has been set. The general alarm function is the alarm function performed by a conventional clock. The program proceeds to decision point 212 where a determination is made if the time fetched at decision point 212 is equal to the current time. If the answer is "yes" at decision point 212, the program branches to decision point 214 where a determination is made if the alarm 60 is on. If the answer is "no" at decision point 214, the program branches to decision point 216 to be described, below. If the answer is "yes" at decision point 214, the program branches to decision point 218 where the multiple tone audio alarm 60 is activated. The program proceeds to decision point 220 where a determination is made if the alarm 60 has been shut off. The multiple tone audio alarm includes a switch contained within the multiple tone audio alarm 60 of FIG. 4 which is used to shut off the alarm and provide a signal to the microprocessor signaling that the alarm has been turned off. If the answer is "no" at decision 220, the program proceeds to point 222 where the alarm is activated for a period up to 5 minutes. After the elapsing of 5 minutes, the program will automatically disable the alarm. The program proceeds from point 222 to point 216 which is described, below. If the answer is "yes" at decision point 220, the program proceeds to point 224 where the alarm 60 is shut off and the time of activating the alarm is erased from memory. The program proceeds from point 224 to point 216 where a determination is made if the battery (not illustrated) is low. If the answer is "yes" at decision point 216, the program branches to point 226 where the low battery indicator 46 is activated. If the answer is "no" at point 216, the program branches to point 202 (FIG. 7) described, above. If the answer is "yes" at decision point 208 (FIG. 10), the previously described medication dispensing signal is produced and the program branches to point 266 where the visual indicator 32 associated with the compartment 14 which contains the one or more medicines which are to be taken in response to the alarm is activated. The location of the visual indicator 32 in proximity to and associated with the compartment 14 which contains the medication to be taken immediately informs the person of the location of the medication to be taken upon the pulsating of the particular visual indicator. The program proceeds to point 268 where the multiple tone audio alarm 60 is activated. The program proceeds to point 270 where any remote alarm device is activated by the activation of a transmitter to cause its activation. The program proceeds to point 272 where data is transferred from the ROM 56 to a conventional video display processor for the purpose of generating a word message to be displayed at the bottom of the person's television set by the generation of an appropriately modulated RF carrier which is to be processed by the person's television set. The program proceeds to point 274 where the RF modulated carrier is outputted to the person's t.v. set. The program proceeds to point 276 where the appropriate speech synthesis data stored in the ROM 56 is outputted to the voice synthesizer 64 to cause the generation of a synthesized voice message. If the alarm times have been programmed by the person, a flag is set to cause the fetching of a standard message from the ROM 56 such as "it is now time to take your medicine in compartment number _". If, on the other hand, the times for dispensing medication have been set by programming in accordance with the code read by the code reader 50, the speech synthesis information associated with the medication information stored in one of the blocks 100 which is to be dispensed is fetched and used for generating the synthesized voice message. In order to identify the location in memory at which the speech synthesis data is to be fetched, it is necessary to read the code number with the code reader 50 which identifies the beginning address of the block of programming information 100 in ROM 56. The program proceeds to decision point 278 (FIG. 11) where a determination is made if the person has responded by the depressing of the acknowledgment switch 34 located in proximity to the compartment 14 containing the medication which is to be taken. If the answer is "no" at decision point 278, the program branches to point 280 where the multiple tone audio alarm 60 is activated for a period up to 5 minutes. If the person acknowledges the taking of the one or more medications stored in the compartment 14 associated with the visual indicator 32 which is pulsating by activating the associated acknowledgment switch 34, the multiple tone audio alarm is immediately stopped. The multiple tone audio alarm is automatically shut off at the end of 5 minutes at point 283. At point 285 a print routine for printing the information of Table III or IV, depending upon the number of dosages of the medication which have been missed, is performed. The controlprogram includes a counter which is assigned to each of the compartments 14. Each time the alarm function is activated to signal that it is time to take a dosage of one of the medications, the counter is reset to zero. Each time the program proceeds to point 283, the counter assigned to the compartment 14 which stores the medication is augmented by one. When the count reaches one, the message of Table III is printed out. When the count reaches two or more, the message of Table IV is printed out. The program then branches to point 202.

If the answer is "yes" at decision point 278, the program branches to point 281 where the pulsating light 32 associated with the compartment 14 which holds the medicine which is to be taken and the multiple tone audio alarm 60 is shut off. The program proceeds to point 282 where the identity of the medication taken, the time of taking the medication and the date of taking the medication is sent to the RAM 58 for storage in the associated storage block 102 as illustrated in FIG. 6. If the medication dispensing times have been programmed manually, the identification of the medicine is by storage of the compartment number (1–6) 17 of the compartment 14 holding the medication. If, on the other hand, the dispensing times have been programmed by the reading of a coded beginning address of the block of programming information 100 by code reader 50, the complete identification of the medicine is stored as stored in the ROM location 100. The program then proceeds to point 284 where a print subroutine is entered to cause the printer 53 to print the message of Table II. The program then proceeds to point 210. It is within the scope of the invention to permit a person to request a printout of one or more of the individual storage locations 102 up to the complete number of storage locations.

If the answer is "no" at decision point 204, the program branches to point 288 where a determination is made if the multiposition mode switch 28 or equivalent is in the first mode. If the answer is "yes" at decision point 288, the program branches to a subroutine at which the times for activating the alarm for each of the medicines to be dispensed from the individual compartments 14 is set. The program proceeds to point 290 where the hour setting switch 38 is depressed to set a display on the hours display of the time indicator 20 of the desired hour of the activation of the alarm function. Each depressing of the switch 38 causes the hour displayed on the time display 20 to be increased. The person stops the depressing of the hour display switch 38 at the time that the desired hour is displayed on the time display 20. The program proceeds to point 292 where the minutes setting switch 40 is depressed to cause the display of the desired time in minutes at which the alarm function for the dispensing of a particular medicine is to be activated. Each time the switch 40 is depressed, the display of the minutes is increased. The person stops depressing the switch 40 when the desired number of minutes is displayed on the time display 20. The program proceeds to point 294 where the person depresses the acknowledgment switch 34 associated with the compartment 14 which is to store the medication which is to be dispensed at the time which has been set at blocks 290 and 292. The program proceeds to point 296 where the entry switch 42 is depressed once to cause the entering of the desired code entered at step 295 as discussed above and twice if the medication is one which is a refillable prescription and it is desired to activate the printing of the message of Table IX described above.

The program may proceed to point 297, which is optional. Point 297 is used for correlating an actual identification of a medication stored in the memory ROM 56 with the compartment 14 number which is to store the medication. When an actual identification of a medication stored in ROM 56 has been correlated with the compartment number storing that medication, by optional step 297 as described below, the closing of the acknowledgment switch 34 associated with the compartment number to signal the taking of that medication in any of the operational modes will cause the actual medication identification as stored in the ROM 56 to be printed in place of the text identifying a compartment number in the Tables II-IX. The control program uses the signal from the closing of the acknowledgment switch 34 from the compartment which stores a medication as a pointer to the address in ROM 56 where the identification of the medication is stored which has been correlated with the compartment storing the medication. The identification of each medication including at least the generic name or brand name and further optional information such as the dosage and frequency of taking the medication is stored in a block of the ROM 56 which is addressed by a two or three digit code which is entered by an input device 74 such as a numerical keypad. The person identifies the code of the medication by matching the information provided with the medication (either from the prescription or from bottles of over-the-counter medication) with a printed list which correlates the code with a particular medication. For example, if a person was to take aspirin in a 5 mg. size, the printed list would be checked which preferably is alphabetical to find aspirin in a 5 mg. size. The code associated with aspirin is entered which provides the address in the ROM 56 for retrieving all pertinent information about aspirin. Thereafter, when aspirin is taken on demand, the identification of the medication will print out aspirin 5 mg. and other information associated therewith. The program proceeds to point 202 as previously described.

If the answer is "no" at decision point 288, the program proceeds to decision point 298 where a determination is made if the multiposition mode switch 28 or equivalent is in the second mode. If the answer is "yes" at decision point 298, the program branches to a subroutine for setting the time to activate the general purpose alarm function of the timing device contained within the microprocessor 54. The program proceeds to point 300 where the hours setting switch 38 is activated in the manner previously described in conjunction with block 290. The program proceeds to point 302 where the minutes setting switch 40 is activated in the manner previously described in conjunction with block 292. The program proceeds to point 304 where the entry switch 42 is closed to cause the entry of the desired time for activating the general alarm function in the RAM 58. The program proceeds to point 202 as previously described.

If the answer is "no" at decision point 298, the program branches to decision point 306 where a determination is made if the multiposition mode switch 28 or equivalent is in the third mode. If the answer is "yes" at decision point 306, the program branches to a subroutine for setting the correct display time. The program proceeds to point 308 where the hours setting switch 38 is activated in a manner analogous to that previously described in conjunction with points 290 and 300. The program proceeds to point 310 where the minute switch 40 is activated in a manner analogous to that described in conjunction with points 292 and 302. The program proceeds to point 312 where the entry switch 42 is closed to cause the entry of the desired time into the RAM memory 58. The program proceeds to point 202 as previously described.

If the answer is "no" at decision point 306, the program branches to decision point 314 where a determination is made if the multiposition mode switch 28 or equivalent is in the fourth mode. If the answer is "yes" at decision point 314, the program branches to a subroutine for setting the desired month and date. The program proceeds to point 316 where the month setting switch 38 is activated to set the desired month in a manner analogous to the setting of hours described at points 290, 300 and 308. The program proceeds to point 318 where the desired date is set by the depressing of the date setting switch 40 in a manner analogous to the setting of the desired minutes as described at points 292, 302 and 310. The program proceeds to point 320 where the entry switch 42 is closed to cause the storage of the desired month and date in the RAM 58. The program proceeds to point 202 as previously described.

If the answer is "no" at decision point 314, the program branches to decision point 322 where a determination is made if the multiposition mode switch 28 or equivalent is in the fifth mode. If the answer is "yes" at decision point 322, the program branches to a subroutine which permits the display of the next alarm function for indicating that a medication is to be taken which is located in a particular compartment 14. The program proceeds to point 324 where the switch 36 is depressed to cause a display on the time display 20 of the time of the next alarm function indicating that a medication is to be taken. The program proceeds to point 202 as previously described.

If the answer is "no" at decision point 322, the program proceeds to decision point 326 where a determination is made if the multiposition mode switch 28 or equivalent is in the sixth position. If the answer is "yes" at decision point 326, the program branches to a subroutine for setting the desired day of the day display 26. The program proceeds to point 328 where the switch 40 is depressed to set the desired display of the correct day. Each time the switch 40 is depressed, the day is augmented by 1. When the desired day is displayed on the day display 26, the multiposition mode switch 28 or equivalent is changed to another position to enter another mode of operation. The program proceeds to point 202 as previously described.

If the answer is "no" at decision point 326, the program proceeds to decision point 330 where a determination is made if the multiposition mode switch 28 or equivalent is in the seventh mode. If the answer is "yes" at decision point 330, the program branches to a subroutine for reading the person's blood pressure by the activation of the blood pressure monitor 70. The program proceeds to point 332 where the person connects the blood pressure sensor to permit the taking of a reading. The program proceeds to point 334 where the entry switch 42 is closed to cause entry of the blood pressure reading which has been read into the part "b" of sections 102 the RAM of FIG. 6 as illustrated at point 336. The program proceeds to point 202 as previously described.

If the answer is "no" at decision point 330, the program proceeds to decision point 338 where a determination is made if the multiposition mode switch 28 or equivalent is in the eighth mode. If the answer is "yes" at decision point 338, the program branches to a subroutine for causing the pulse rate of the person to be monitored. The program proceeds to point 340 where the pulse rate monitor is connected to the person. The program proceeds to point 342 where the entry switch 42 is closed to cause the storage of the pulse rate which has been read in the part "c" of memory sections 102 of FIG. 6 as illustrated at point 334. The program proceeds to point 202 as previously described.

If the answer is "no" at decision point 338, the program proceeds to decision point 346 where a determination is made if the multiposition mode switch 28 or equivalent is in the ninth mode. If the answer is "yes" at decision point 346, the program branches to a subroutine for reading the person's temperature. The program proceeds to point 348 where the temperature monitor is used by the person to take a reading of the person's temperature. The program proceeds to point 350 where switch 42 is closed to cause the storage of the temperature reading in part "a" of memory sections of 102 of FIG. 6 as illustrated at point 352. The program proceeds to point 202 as previously described.

It should be understood that an additional operating mode identified by the position of the multiposition mode switch 28 or equivalent is provided for the reading of each body parameter.

If the answer is "no" at decision point 346, the program proceeds to decision point 354 where a determination is made if the multiposition mode switch 28 or equivalent is in the tenth mode. If the answer is "yes" at decision point 354, the program branches to a subroutine which causes the reading of a coded address contained on or in conjunction with a person's prescription is as illustrated in FIG. 3 by the code reader 50. As stated above, the code is the beginning address of the block of information 100 to be used for programming each dosage time of a particular commonly prescribed medicine. The program proceeds to point 356 where the code reader 50 is initialized to permit the reading of the code. As described above, preferably the code reader is a commercially available reader designed for reading the universal bar code. The program proceeds to point 358 where the address which has been read by the code reader 50 is inputted to the microprocessor to permit the fetching from the ROM 56 of the desired programming information in one of the blocks 100 as described above in conjunction with FIGS. 5(*a*) and 5(*b*). The program proceeds to point 360 where the beginning memory address of the block 100 in the ROM 56 is read which is addresed by the number which has been read by the code reader. The program proceeds to point 362 where the programming information which has been read from the addressed block 100 in the ROM memory 56 is entered into the RAM memory 58 and the desired times for taking that medication are programmed in a manner analogous to the person activated subroutines described above with regard to the setting of the time for activating the alarm function to indicate that a medication should be taken. Further in accordance with this mode of operation, incompatibility between medications can be checked prior to operation. Each location 100 of the ROM 56 can be programmed to store the identification of other medications which should not be taken in conjunction with the particular medication stored at the location. The storage of the identification of incompatible medications can be by the address 100 of FIG. (*a*) such as "1", "2", etc. Then a comparison step can be made such that the number of the medications which are already programmed to be taken a stored in the ROM 56 can be compared with the medication to be taken in accordance with the stored programming information stored in one of the memory blocks. When an incompatibility is detected between previously programmed medications and the medication to be taken, an alarm may be activated and the incompatibility can be entered into the RAM data base.

The choice of the medications which are to be included within the ROM 56 to implement the programming feature activated by the reading of the beginning memory address of a particular block of programming information 100 by the code reader 50 is a matter of choice which ultimately is only limited by the amount of memory available in ROM 56. As a practical matter, approximately the top 100 prescriptions account for approximately 70% of the prescriptions being written. Additionally, there are approximately 600 base medications which are prescribed and approximately 25,000 different brands of prescription medicines. Thus, in accordance with the invention, the number of medications which are stored in the ROM memory can be chosen from the commercially available base medicines. The pharmacist filling the prescription controls the programming of the times for administration of a particular medicine by the encoding of the beginning address of the block of programming information 100 on or in conjunction with the address in the ROM 56 at which is found the identification of the medication including size of dosage, the times for dispensing dosages or time between dosages, the number of dosages to be taken and the appropriate data for creating a voice synthesized message of instructions for taking the medication. In the preferred form of the invention, the pharmacist will utilize a universal bar code generator for encoding on the side of the prescription container or on the top thereof the beginning memory address of the block of programming information 100 in the ROM 56 at which the date for programming that particular medication is stored. It is only necessary to store medication identifications and times for taking of dosages for generic brands of the medication for the reason that the voice synthesized message does not have to identify the particular brand name or its generic identification. Thus, if the physician writing the prescription requires that it be filled with a brand name, the pharmacist needs to only encode with the universal bar code writer or an equivalent code generator the beginning address in the ROM 56 of the block of programming information 100 where the appropriate generic medication programming date is stored.

When the dispensing of medication is programmed in accordance with the programming information stored at the blocks 100 in the ROM memory 56, the actual times at which medication is to be taken can be see in either of two ways. In the first way, especially in the case of medications which must be taken around mealtime, the times for taking the medication which are stored in the memory may be set at times at which persons conventionally would be eating if they follow a normal meal schedule. In the alternative, the storage location associated with each medication will store the interval between which dosages of the medication are to be taken. The actual time for taking each dosage of the medication is determined by the first dosage being taken at the time that the code reader 50 reads the beginning address of the block of programming data 100 in the ROM 56 with the subsequent times being determined by the adding of the interval between dosages to the time of the first dosage. In either way, the total number of dosages which is stored in the addressed storage location 100 in the ROM 56 which is associated with the particular medication is monitored by a software counter which is associated with each of the storage locations 102 of the medications 1−N of FIG. 5. The number of dosages which has been taken which is stored in the memory section 102 associated with that medication is compared with the counter value. When the total number of dosages to be taken is equal to the number which has actually been taken, the dosage schedule which is stored in the RAM 58 is preferably erased. However, the dosage history may be retained depending on memory capacity for any desired time interval.

At any time during the alarm cycle in either the mode where the person programs the dosage intervals or where the programming is done in response to the reading of programming from the ROM 56, the person's entire dosage history may be outputted to form a copy of the history which is outputted by the printer 53. Additionally, the same outputting capability may be provided with respect to the body parameters such as temperature, blood pressure and pulse rate storage functions described above.

In position 10 of the multiposition mode switch or equivalent the code reader 50 automatically programs the times for taking a medication by reading the information for programming directly from the coding contained on the prescription container or provided in conjunction with the prescription instead of obtaining it from a ROM. With this embodiment, the coded information read by the code reader 50 is decoded by the microprocessor 54 and used to automatically program the times for taking the medication in a manner analogous to that described for the manual programming of the times for taking medication as described with reference to points 288-296 of FIG. 7.

Additionally, the printing of the information of Table I may be performed in an on demand basis by the providing of a separate mode enterable through the multiple position mode switch 28 or equivalent. In this case, the program proceeds to decision point 364 where a determination is made if the multiposition mode switch 28 or equivalent is in position 11. If the answer is "yes", the program proceeds to point 366 where a print routine is executed to print out the text of Table 1. Any suitable print routine may be utilized. The program then returns to point 202.

When taking medications of either a prescription or nonprescription type on an as needed basis or on demand ahead of scheduled time during the operation of the programmed alarm, one embodiment of the invention permits the inputting of acknowledgement signals from the acknowledgment switches 34 in response to an alarm or upon the patient's own volition. This mode of operation has the potential disadvantage that any closing of an acknowledgement switch 34 (point 209 of FIG. 10) is recorded as a taking of a medication. It is thus possible that erroneous inputs could occur by the accidental closing of an acknowledgment switch 34 or by a child playing with the acknowledgment switches.

An additional mode may by added to permit the recording of the taking of only medications on an as needed basis. In this mode, the program proceeds to decision point 368 where a determination is made if the multiposition mode switch or equivalent is in position 12. If the answer is "yes" at decision point 368, the program proceeds to point 370 where the program continually monitors each of the latches associated with the acknowledgment switches 34 to determine if any acknowledgments have been received in a manner analogous to step 209 of FIG. 10. Depending upon which type of as needed medication is taken (general assigned categories or miscellaneous as discussed above), the printer causes the message of Table V or Table VI to be printed upon the closing of an acknowledgment switch 34. It should be noted that the programmable timer may be operational in this mode to signal scheduled appointments to health care personnel and to print out the message of Table X in advance of the scheduled time. The program then returns to the main program at point 202.

The medication clock of the present invention has the capability of permitting medications which are to be taken under the control of the programmed clock to be taken on demand ahead of schedule by the entry into a separate mode. The program proceeds to decision point 372 where a determination is made if the multiposition mode switch 28 or equivalent is in position 13. If the answer is "yes" at decision point 372, the program proceeds to point 374 where the program continually monitors each of the acknowledgment switches 34 in a manner analogous to step 209 of FIG. 10 to determine which medication is being taken. The closing of one of the acknowledgment switches 34 causes the information of Table VIII to be printed and the alarm function to be disabled for the dosage(s) which was taken ahead of schedule. It should be noted that the programmable timer may be operational in this mode to signal scheduled appointments to health care personnel and to print out the message of Table X in advance of the scheduled time. The program then returns to the main program at point 202.

If the answer is "no" at decision point 372, the program proceeds to decision point 376 where a determination is made if the multiposition mode switch 28 or equivalent is in position 14. Position 14 is used for the programming of the time and date of scheduled appointments to visit health care personnel. If the answer is "yes" at decision point 376, the program proceeds to point 378 where the time and date of each scheduled doctor's appointment is programmed. Point 378 is representative of steps 290, 292 and the depressing of the switch 42 for the first time at point 296 in FIG. 7. The time and date of a series of appointments are programmed by the repeating of the aforementioned steps 290, 292 and 296. If the answer is "no" at decision point 376, the program then returns to the main program at point 202.

Moreover, mode zero may be modified to permit operation in response to only programmed alarm operation. Thus in mode zero, no response would be made to acknowledgment signals from the acknowledgment switches 34 which are not in response to the activation of an alarm by the programmed clock 54.

While the invention has been described in terms of its preferred embodiment, it is intended that numerous modifications may be made thereto without departing from the spirit and scope of the invention as defined in the appended claims.

We claim:

1. A medication compliance device comprising:

(a) a plurality of compartments with each compartment being separately usable for holding one or more medications to be taken by a person;

(b) a programmable timer which produces a medication dispensing signal indicating the time that a person is to take one or more medications to be taken at specific times;

(c) an alarm, responsive to the medication dispensing signal produced by the programmable timing means, for producing an alarm for alerting the person that it is time to take a medication located within one of the compartments;

(d) means located in proximity to each of the compartments which are separately activable by the person for producing an acknowledgment signal that any one of the medications stored in one of the compartments has been taken;

(e) a memory, coupled to the programmable timer, for storing the time of occurrence of each acknowledgment signal produced by one of the means for producing an acknowledgment signal and an identification of the compartment in proximity therewith and for storing prerecorded information used for correlating an actual identification of the medications being taken with the compartment which is recorded with each acknowledgment signal; and (f) a record producer, coupled to the memory, for providing a record of the prerecorded information, permitting a correlation to be made between the medication being taken and the compartment within which the medication is being stored, and a dosage record of the medication being taken, and time of taking each dosage of medication for each of the medications being taken by the person.

2. A medication compliance device in accordance with claim 1 wherein:

(a) the programmable timer also produces an indication of the date that each dosage is to be taken; and (b) the date of occurrence of each acknowledgment signal is stored in the memory for storing the time of occurrence of each acknowledgment signal and is provided as part of the dosage record by the record producer.

3. A medication compliance device in accordance with claim 1 wherein:

the record producer comprises a printer.

4. A medication compliance device in accordance with claim 1 wherein:

the memory stores the identification of the compartment as an identification of medication that was taken.

5. A medication compliance device in accordance with claim 1 wherein:

the means which are separately activable are each located in proximity to a different one of the compartments.

6. A medication compliance device in accordance with claim 5 wherein:

the stored information output comprises a printer.

7. A medication compliance device comprising:

(a) a plurality of compartments with each compartment being separately usable for holding one or more medications to be taken by a person;

(b) a programmable timer which produces a signal indicating the time that a person is to take one or more medications to be taken at specific times;

(c) an alarm, responsive to the signal produced by the programmable timer, for producing an alarm for alerting the person that it is time to take a medication located within one of the compartments;

(d) switching which are separately closed by the person for producing an acknowledgment signal that any one of the medications stored in one of the compartments has been taken by the person; and (e) a memory, coupled to the programmable timer, for storing the time of occurrence of at least one of the acknowledgment signals, produced by one of the switches for producing an acknowledgment signal, and an identification of the medication taken associated with one of the compartments with the identification being stored including a number of a compartment with which the medication was associated at a time of taking the medication.

8. A medication compliance device in accordance with claim 7 further comprising:

a stored information output, coupled to the memory, for providing a dosage record of information stored in the memory for each medication being taken including an identification of the medication as a compartment number, and the time and date of each dosage taken.

9. A medication compliance device in accordance with claim 7 further comprising:

(a) a device for reading one or more body parameters; and (b) means, coupled to the device for reading body parameters, for causing the one or more parameters to be stored in the memory along with the date and time that each body parameter was read.

10. A medication compliance device comprising:

(a) a plurality of compartments with each compartment being separately usable for holding one or more medications to be taken by a person;

(b) switches which are separately closed by the person for producing an acknowledgment signal that any one of the medications stored in one of the compartments has been taken by the person; and (c) a memory, coupled to the switches and to a time source, for storing a time of occurrence of at least one of the acknowledgment signals, produced by one of the switches for producing an acknowledgment signal, and an identification of the medication taken associated with one of the compartments with the identification being stored including a number of a compartment with which the medication was associated at a time of taking the medication.

* * * * *